(12) United States Patent
Choi et al.

(10) Patent No.: US 11,256,098 B2
(45) Date of Patent: Feb. 22, 2022

(54) ELECTRONIC DEVICE AND METHOD FOR DISPLAYING AUGMENTED REALITY

(71) Applicant: SAMSUNG ELECTRONICS CO., LTD., Suwon-si (KR)

(72) Inventors: Myongjo Choi, Suwon-si (KR); Kyusub Kwak, Suwon-si (KR); Jeongeun Yun, Suwon-si (KR); Kyookeun Lee, Suwon-si (KR); Wonjun Lee, Suwon-si (KR); Jongchul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/336,707

(22) Filed: Jun. 2, 2021

(65) Prior Publication Data

US 2021/0286184 A1 Sep. 16, 2021

Related U.S. Application Data

(63) Continuation of application No. 16/921,180, filed on Jul. 6, 2020, now Pat. No. 11,061,238.

(Continued)

(30) Foreign Application Priority Data

Oct. 18, 2019 (KR) .......................... 10-2019-0129992

(51) Int. Cl.
*G02B 27/01* (2006.01)
*G06K 9/00* (2022.01)
*G02B 3/00* (2006.01)

(52) U.S. Cl.
CPC ....... *G02B 27/0172* (2013.01); *G02B 3/0081* (2013.01); *G06K 9/00671* (2013.01); *G02B 2027/0178* (2013.01)

(58) Field of Classification Search
CPC .................................................. G02B 27/0172
See application file for complete search history.

(56) References Cited

U.S. PATENT DOCUMENTS 7,475,985 B2    1/2009 Blum et al.
9,651,786 B1 *  5/2017 Browne ................... G09G 3/02
(Continued)

FOREIGN PATENT DOCUMENTS

KR    10-2016-0147636 A    12/2016
KR       10-1868405 B1      6/2018
(Continued)

OTHER PUBLICATIONS

International Search Report (PCT/ISA/210) and Written Opinion (PCT/ISA/237) dated Oct. 13, 2020 issued by the International Searching Authority in International Application No. PCT/KR2020/008402.

(Continued)

*Primary Examiner* — Edmond C Lau
(74) *Attorney, Agent, or Firm* — Sughrue Mion, PLLC

(57) ABSTRACT

An electronic device for displaying augmented reality (AR) includes: an optical engine configured to output light of virtual image; a waveguide from which the light of the virtual image is output and through which light of a real scene is transmitted; an optical shutter configured to transmit or block the light of the real scene; a focus tunable lens configured to adjust a focal length for the light of the virtual image output from the waveguide; and one or more processors configured to, during a first period, control the optical shutter to block at least part of a first light of the real scene, and control the focus tunable lens to have a first focal length, and during a second period, control the optical shutter to (Continued)

transmit a second light of the real scene, and control the focus tunable lens to have a second focal length different from the first focal length.

14 Claims, 24 Drawing Sheets

Related U.S. Application Data

(60) Provisional application No. 62/870,704, filed on Jul. 4, 2019.

(56) References Cited

U.S. PATENT DOCUMENTS

| | | | |
|---|---|---|---|
| 9,927,614 B2 | 3/2018 | Vallius | |
| 10,036,901 B2 | 7/2018 | Yadin et al. | |
| 10,108,014 B2 | 10/2018 | Vallius et al. | |
| 10,656,423 B2 | 5/2020 | Kim et al. | |
| 1,069,012 A1 | 6/2020 | Cui | |
| 2016/0011419 A1 | 1/2016 | Gao | |
| 2017/0068134 A1 | 3/2017 | Yadin et al. | |
| 2017/0160440 A1 | 6/2017 | Yadin et al. | |
| 2018/0089871 A1 | 3/2018 | Ko et al. | |
| 2018/0196263 A1* | 7/2018 | Vallius | G02B 27/01 |

FOREIGN PATENT DOCUMENTS

| | | |
|---|---|---|
| KR | 1020190039658 A | 4/2019 |
| WO | 2006/022346 A1 | 3/2006 |
| WO | 2017/158486 A1 | 9/2017 |
| WO | 2017/182906 A1 | 10/2017 |
| WO | 2017/216716 A1 | 12/2017 |
| WO | 2018187578 A2 | 10/2018 |
| WO | 2018231784 A1 | 12/2018 |
| WO | 2019084334 A1 | 5/2019 |

OTHER PUBLICATIONS

Office Action dated Nov. 12, 2020 issued by the United States Patent and Trademark Office in U.S. Appl. No. 16/921,180.
Notice of Allowance dated Mar. 3, 2021 issued by the United States Patent and Trademark Office in U.S. Appl. No. 16/921,180.

* cited by examiner

0 : Real Image    1 : Virtual Image1    2 : Virtual Image2    VR Glass

ELECTRONIC DEVICE AND METHOD FOR DISPLAYING AUGMENTED REALITY

CROSS-REFERENCE TO RELATED APPLICATIONS

This is a continuation of U.S. application Ser. No. 16/921,180 filed on Jul. 6, 2020, which is based on and claims the benefit of U.S. Provisional Application No. 62/870,704, filed on Jul. 4, 2019, in the United States Patent and Trademark Office, and claims priority under 35 U.S.C. § 119 to Korean Patent Application No. 10-2019-0129992, filed on Oct. 18, 2019, in the Korean Intellectual Property Office. The disclosures of the above-named applications are incorporated by reference herein in their entireties.

BACKGROUND

1. Field

The disclosure relates to an electronic device and method for displaying augmented reality (AR).

2. Description of Related Art

AR devices allowing users to experience AR include, for example, AR glasses. An image optical system of an AR device includes an image generating device for generating an image and a waveguide for sending the generated image to a user's eyes. The image output from the image generating device (e.g., a projector) is emitted through the waveguide to the user's eyes, and he/she observes the image.

An AR device creates a three-dimensional (3D) effect by providing, to both eyes, images rendered to have binocular disparity. Although a 3D effect using such binocular disparity may be relatively easily created and experienced by using various methods of implementing 3D, when a user wears a device for creating a 3D effect for a long time, the user gets eyestrain. The eyestrain may occur because a vergence distance and a focal length of both eyes are not the same, and such a disagreement between the vergence distance and the focal length is known as vergence accommodation conflict (VAC).

SUMMARY

Provided is an AR device that may reduce eye strain.

Provided is an AR device that may respond to a region of interest of a user when multiple virtual images are provided.

Additional aspects will be set forth in part in the description which follows and, in part, will be apparent from the description, or may be learned by practice of the presented embodiments of the disclosure.

In accordance with an aspect of the disclosure, an electronic device for displaying AR includes: an optical engine configured to output light of a virtual image; a first polarizer positioned in a path of light of a real scene; a polarization converter configured to maintain or convert a polarization direction of light; a waveguide from which the light of the virtual image is output and through which the light of the real scene is transmitted; a focus tunable lens of which a focal length for the light of the virtual image output from the waveguide is adjusted; a second polarizer positioned between the waveguide and the focus tunable lens or between the polarization converter and the waveguide; and one or more processors configured to, during a first period, control the polarization converter to convert a polarization direction of a first light of the real scene that has passed through the first polarizer such that at least part of the first light of the real scene is blocked by the second polarizer; and during a second period, control the polarization converter to maintain a polarization direction of a second light of the real scene that has passed through the first polarizer such that the second light of the real scene is transmitted through the second polarizer.

The polarization converter may include a liquid crystal panel.

The one or more processors may be further configured to, during the first period, control the optical engine to output the light of the virtual image, and during the second period, control the optical engine not to output the light of the virtual image.

The one or more processors may be further configured to, during the first period, control the focus tunable lens to have a first focal length for the light of the virtual image, and during the second period, control the focus tunable lens to have a second focal length, and the second focal length may be different from the first focal length.

The first focal length may be a focal length for moving an image plane of the virtual image to a position of a depth of the virtual image.

The second focal length may be infinite.

The second focal length may be a focal length for correcting a user's vision.

The first period and the second period may alternate between each other.

The one or more processors may be further configured to, during the first period, control the optical engine to output light of a plurality of virtual image layers having different depths through time division, and control the focus tunable lens according to different first focal lengths corresponding to the depths of the plurality of virtual image layers.

The electronic device may further include an eye tracker configured to track a user's gaze.

The one or more processors may be further configured to, during the first period, generate the virtual image so that the virtual image has a depth of a gaze point of the user tracked by the eye tracker.

The one or more processors may be further configured to, during the first period, generate a plurality of virtual image layers having different depths, wherein a frequency of a virtual image layer having a depth near to a gaze point of the user tracked by the eye tracker is greater than a frequency of a virtual image layer having a depth far from the gaze point of the user.

The focus tunable lens may be a liquid crystal lens, a liquid lens, or a movable lens.

The electronic device may be a glasses-type device.

In accordance with an aspect of the disclosure, an electronic device for displaying AR includes: a waveguide from which light of a virtual image is output and through which light of a real scene is transmitted; an optical engine positioned on a portion of a rear surface of the waveguide; an optical shutter positioned on a front surface of the waveguide and configured to transmit or block incident light of the real scene under electrical control; a focus tunable lens positioned on another portion of the rear surface of the waveguide and having a focal length adjusted by electrical control; and one or more processors configured to: during a first period, control the optical shutter to block at least part of a first light of the real scene, and during a second period, control the optical shutter to transmit a second light of the real scene.

The optical shutter may be a liquid crystal optical shutter or an electrochromic optical shutter.

In accordance with an aspect of the disclosure, an electronic device for displaying AR includes: a waveguide; an optical engine positioned on a side of the waveguide; a polarization converter positioned on a front surface of the waveguide and configured to maintain or convert, under electrical control, a polarization direction of incident light; a first polarizer positioned on a front surface of the polarization converter; a focus tunable lens positioned on a rear surface of the waveguide and having a focal length adjusted by electrical control; a second polarizer positioned between the waveguide and the focus tunable lens or between the polarization converter and the waveguide; and one or more processors, wherein the one or more processors are configured to, during a first period, control the polarization converter to convert a polarization direction of a first light of the real scene that has passed through the first polarizer such that at least part of the first light of a real scene input through the first polarizer is blocked by the second polarizer, and during a second period, control the polarization converter to maintain a polarization direction of a second light of the real scene that has passed through the first polarizer such that the light of the real scene is transmitted through the second polarizer.

In accordance with an aspect of the disclosure, a method of displaying AR includes: during a first period, outputting light of a virtual image from a waveguide to a focus tunable lens; during the first period, controlling the focus tunable lens to have a first focal length; during a second period, not supplying the light of the virtual image to the waveguide and transmitting light of a real scene through the focus tunable lens; and during the second period, controlling the focus tunable lens to have a second focal length different from the first focal length.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
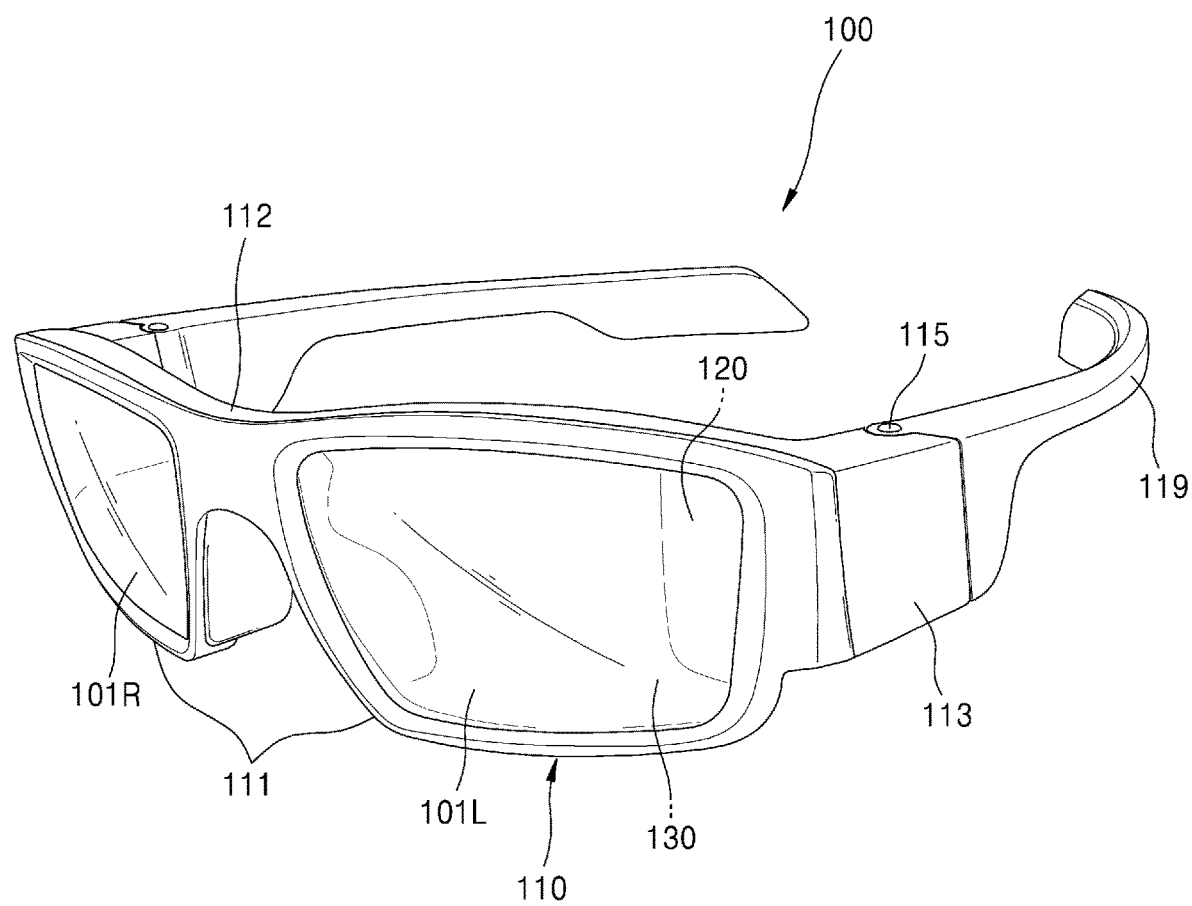
FIG. 1 is a view illustrating an outer appearance of an AR device according to an embodiment.

Embodiments will now be described more fully with reference to the accompanying drawings. In the drawings, the same reference numerals denote the same elements and sizes of components may be exaggerated for clarity. Embodiments of the disclosure may have different forms and should not be construed as limited to the embodiments set forth herein.

Although the terms used herein are selected from among common terms that are currently widely used in consideration of their functions in the disclosure, the terms may vary according the intention of one of ordinary skill in the art, a precedent, or the advent of new technology. Also, in particular cases, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure.

Throughout the disclosure, the expression "at least one of a, b or c" indicates only a, only b, only c, both a and b, both a and c, both b and c, all of a, b, and c, or variations thereof.

As used herein, the singular forms "a," "an," and "the" are intended to include the plural forms as well, unless the context clearly indicates otherwise. Throughout the present application, when a part "includes" an element, it is to be understood that the part additionally includes other elements rather than excluding other elements as long as there is no particular opposing recitation.

Also, the terms such as " . . . unit," "module," or the like used in the disclosure indicate a unit, which processes at least one function or motion, and the unit may be implemented by hardware or software, or by a combination of hardware and software.

The expression "configured to (or set to)" used herein may be replaced with, for example, "suitable for," "having the capacity to," "designed to," "adapted to," "made to," or "capable of" according to cases. The expression "configured to (or set to)" does not necessarily mean "specifically designed to" in a hardware level. Instead, in some cases, the expression "system configured to . . . " may mean that the system is "capable of . . . " along with other devices or parts. For example, "a processor configured to (or set to) perform A, B, and C" may refer to a dedicated processor (e.g., an embedded processor) for performing a corresponding operation, or a general-purpose processor (e.g., a central processing unit (CPU) or an application processor (AP)) capable of performing a corresponding operation by executing one or more software programs stored in a memory.

The term 'augmented reality (AR) used herein is a technology that overlays a virtual image on a physical environment space of the real world or a real world object as a single image.

In the disclosure, examples of 'AR devices' capable of creating AR include AR glasses resembling eyeglasses worn on users, head-mounted display apparatuses, and AR helmets. Such AR devices are usefully used in a daily life such as information retrieval, route guidance, and camera photography. Also, AR glasses resembling eyeglasses may be worn as fashion items and may be used in both indoor and outdoor activities.

The term 'real scene' used herein refers to a scene of the real world seen by an observer or a user through an AR device and may include real world objects. The term 'virtual image' refers to an image generated by an optical engine. The virtual image may include both a static image and a dynamic image. The virtual image may be an image that is overlaid on a real scene to show information about a real world object in the real scene, information about an operation of an AR device, a control menu, etc.

The term 'focus tunable lens' used herein refers to a lens that may change a focal length. A liquid crystal (LC) lens, a liquid lens, a movable lens, or other appropriate focus tunable optical systems may be used as the focus tunable lens. As described below, when a user sees a virtual image, he/she may adjust a focus according to a depth of the virtual image through the focus tunable lens.

The term 'eye tracker' used herein refers to a device for detecting information about a gaze direction in which a user gazes, and may calculate the gaze direction by detecting an image of the pupil or detecting the amount of light or a direction in which illumination light such as near-infrared rays is reflected from the cornea.

The term 'focus' used herein refers to a point where a light ray parallel to an optical axis of a lens passes through the lens (or an optical system) and then a straight line that is the extension of the light ray intersects the optical axis. A distance in air from a principal plane of the lens (or the optical system) to the focus is called a focal length.

The term 'depth of a virtual image' used herein refers to a distance or a depth at which a user perceives the virtual image in a space when the user sees the virtual image. A 3D image using a binocular disparity may generate a left-eye virtual image and a right-eye virtual image having different viewpoints, and in this case, the different viewpoints may be a viewpoint seen by a user's left eye and a viewpoint seen by the user's right eye. Accordingly, a viewpoint of a virtual image in a 3D image using a binocular disparity may be a distance calculated from parallax (i.e., a binocular disparity) between a viewpoint seen by a left eye and a viewpoint seen by a right eye. A multi-depth virtual image may include virtual image layers having different depths (i.e., different binocular disparities).

The term 'gaze direction' used herein refers to a direction in which a user gazes, and the term 'gaze' refers to an imaginary line from a user's pupil along a gaze direction. Mainly, a gaze direction is calculated from information obtained by an eye tracker and a gaze is estimated.

The term 'gaze point' used herein refers to a point at which a user gazes, and may be calculated as a point at which gazes of a user's both eyes intersect. Because a user who sees a 3D image using a binocular disparity perceives the 3D image due to the binocular disparity, a gaze point obtained through a convergence angle of the user's both eyes may be a point (i.e., a depth of a virtual image) at which the user perceives an object (a virtual image layer).

In the real world, a vergence distance to a point at which gazes of both eyes intersect and a focusing distance (accommodation distance) changed by adjusting a thickness of an eye lens match each other, whereas in a virtual image, that is, a 3D image using a binocular disparity, a vergence distance of both eyes and a focusing distance do not match each other. Accordingly, a person who watches a virtual reality (VR) or AR image using a virtual image for a long time or is sensitive to the VR or AR image may have dizziness and eyestrain due to a difference between a vergence distance of the person's eyes and a focusing distance.

Figure 2:
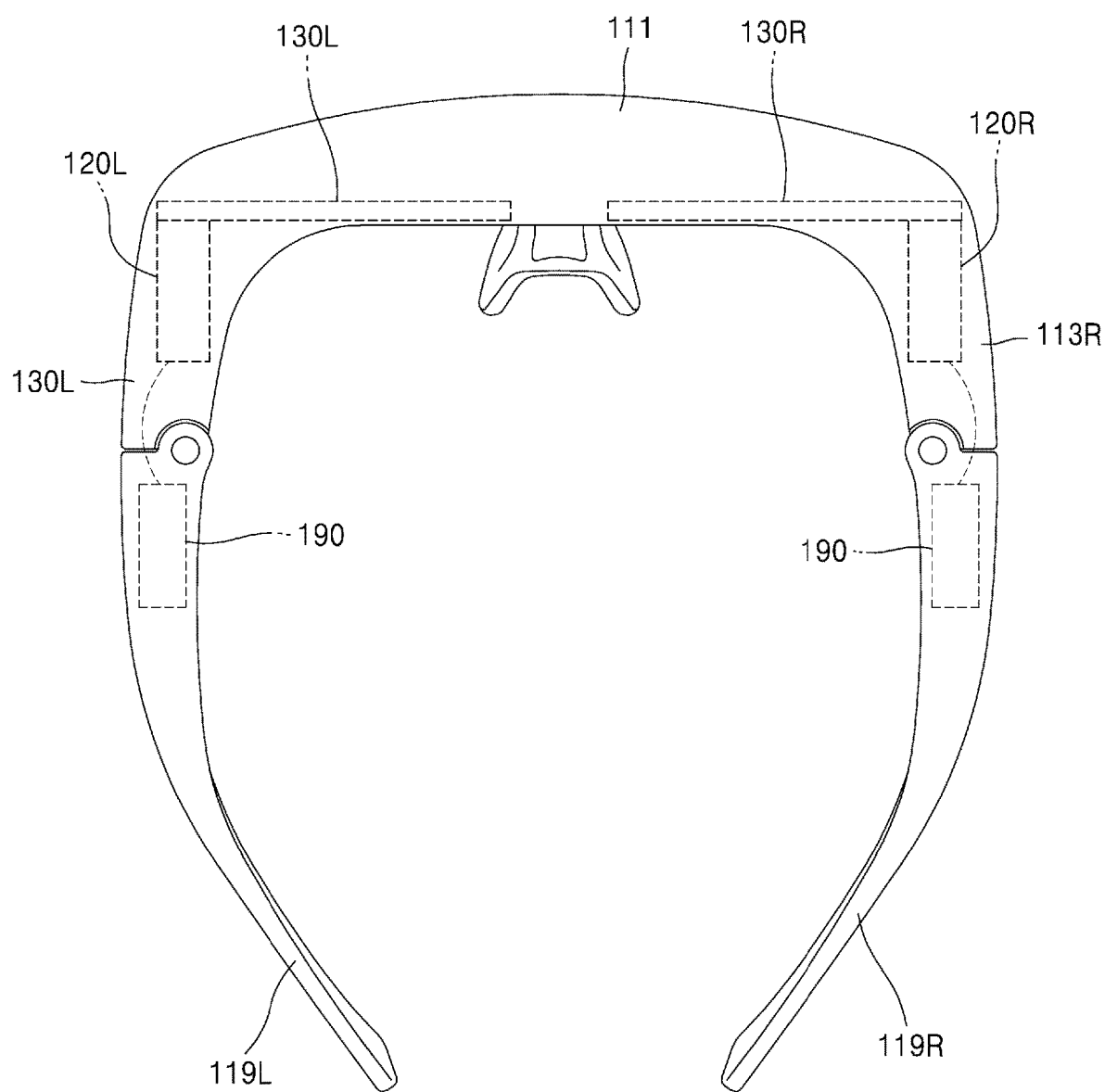
FIG. 2 is a plan view of the AR device of FIG. 1.
Figure 3:
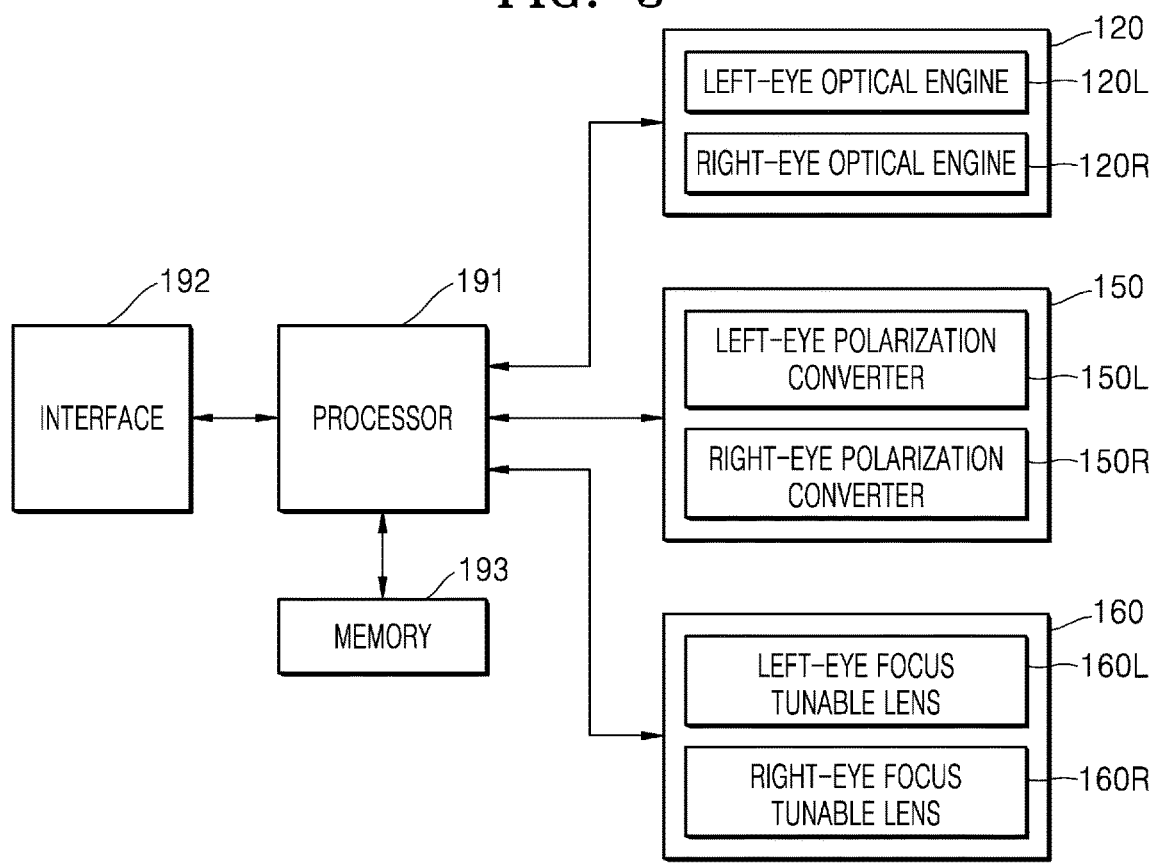
FIG. 3 is a block diagram of the AR device of FIG. 1.
Figure 4:
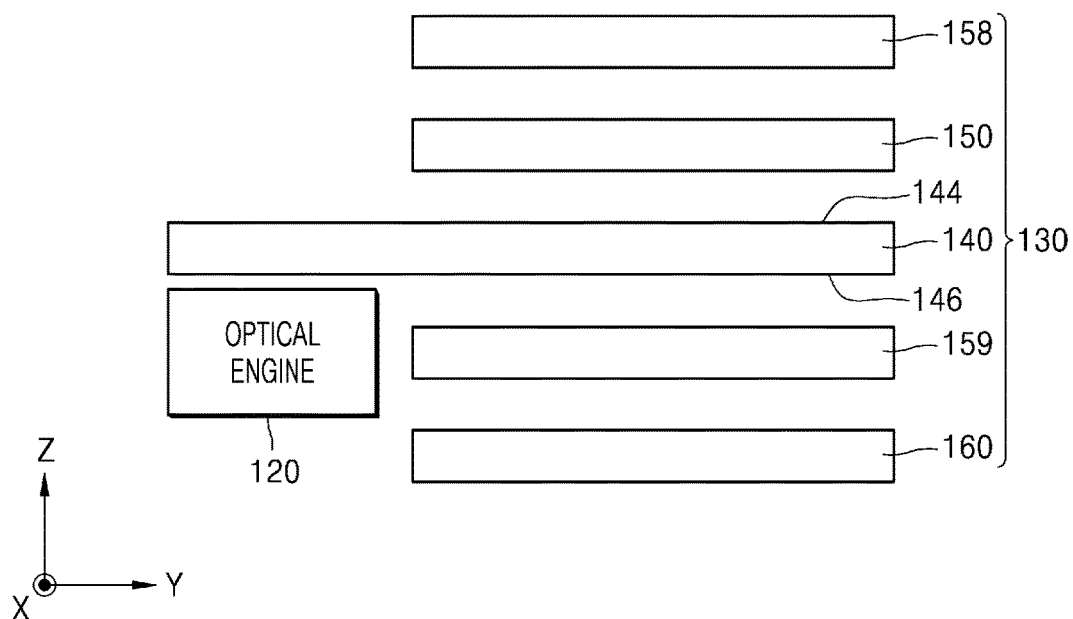
FIG. 4 is a view illustrating an arrangement of an optical engine and optical components according to an embodiment.

FIG. 1 is a view illustrating an outer appearance of an AR device 100 according to an embodiment. FIG. 2 is a plan view of the AR device 100 of FIG. 1. FIG. 3 is a block diagram of the AR device 100 of FIG. 1. FIG. 4 is a view illustrating an arrangement of the optical engine 120 and the optical components 130, e.g., one or more optional elements, according to an embodiment.

Referring to FIGS. 1 and 2, the AR device 100 of the present embodiment is AR glasses resembling eyeglasses worn on a user and includes a glasses body 110.

The glasses body 110 may include, for example, a frame 111 and temples 119. The frame 111 on which left and right lenses 101L and 101R are positioned may have two rim shapes connected to each other via a bridge 112. The left and right lenses 101L and 101R are an example and might have or might not have a refractive power (power). Alternatively, the left and right lenses 101L and 101R may be integrally formed with each other, and in this case, the rim of the frame 111 and the bridge 112 are not separated from each other. The left and right lenses 101L and 101R may be omitted.

The temples 119 are respectively connected to both end portions 113 of the frame 111 and extend in one direction. The both end portions 113 of the frame 111 and the temples 119 may be connected to each other by hinges 115. The hinges 115 are an example, and other appropriate members for connecting the both end portions 113 of the frame 111 and the temples 119 may be used as the hinges 115. As another example, the both end portions 113 of the frame 111 and the temples 119 may be integrally (continuously) connected to each other.

An optical engine 120, a plurality of optical components 130, and electronic components 190 are positioned on the glasses body 110.

The optical engine 120 configured to generate light of a virtual image may be an optical engine of a projector including an image panel, an illumination optical system, and a projection optical system. The optical engine 120 may include a left-eye optical engine 120L and a right-eye optical engine 120R. The left-eye optical engine 120L and the right-eye optical engine 120R may be positioned in the both end portions 113 of the frame 111. As another example, the left-eye optical engine 120L and the right-eye optical engine 120R may be respectively positioned in a left temple 119L and a right temple 119R.

With further reference to FIG. 4, the optical components 130 configured to transmit the light of the virtual image generated by the optical engine 120 and light of a real scene to a user's pupils may include a waveguide 140, a polarization converter 150, first and second polarizers 158 and 159, and a focus tunable lens 160. The optical components 130 may include left-eye optical components 130L and right-eye optical components 130R. The left-eye optical components 130L and the right-eye optical components 130R may be respectively attached to the left and right lenses 101L and 101R. Alternatively, the left-eye optical components 130L and the right-eye optical components 130R may be mounted on the frame 111 separately from the left and right lenses 101L and 101R.

Referring to FIG. 4, the optical engine 120 may be positioned on a rear surface of a portion of the waveguide 140. The rear surface of the waveguide 140 is a surface facing a user's eyes when the user wears the AR device 100.

The optical engine 120 may be positioned to output light of a virtual image in a z-axis direction on one portion of the waveguide 140. The first polarizer 158, the polarization converter 150, the second polarizer 159, and the focus tunable lens 160 are positioned on another portion of the waveguide 140. The polarization converter 150 and the first polarizer 158 may be positioned on a front surface 144 of the waveguide 140, and the second polarizer 159 and the focus tunable lens 160 may be positioned on the rear surface 146 of the waveguide 140. That is, the first polarizer 158, the polarization converter 150, the waveguide 140, the second polarizer 159, and the focus tunable lens 160 may be arranged in the above-mentioned order. Light of a real scene is incident on the other portion of the waveguide 140 in a −z-axis direction.

With further reference to FIG. 3, the electronic components 190 may include a processor 191, an interface 192, and a memory 193, and may be mounted on the temples 119 (see FIG. 1) of the glasses body 110 or the frame 111 (see FIG. 1), may be distributed on a plurality of portions, or may be mounted on a printed circuit board (PCB), a flexible PCB (FPCB), or the like. A polarization converter driving driver circuit for driving the polarization converter 150 and a lens driving driver circuit for driving the focus tunable lens 160 may be positioned adjacent to the polarization converter 150 and the focus tunable lens 160. The polarization converter driving driver circuit and the lens driving driver circuit may be integrally formed with each other. As another example, the polarization converter driving driver circuit and the lens driving driver circuit may be entirely or partially positioned on a main board mounted on, for example, the temple 119.

The processor 191 may control an overall operation of the AR device 100 including the optical engine 120, the polarization converter 150, and the focus tunable lens 160 by driving an operating system or an application program, and may perform operations and processing of various data including image data. For example, the processor 191 may process image data including a left-eye virtual image and a right-eye virtual image rendered to have a binocular disparity. The processor 191 may include at least one hardware device of, for example, but not limited to, a central processing unit, a microprocessor, a graphics processing unit, an application specification integrated circuit (ASIC), a digital signal processor (DSP), a digital signal processing device (DSPD), a programmable logic device (PLD), or a field programmable gate array (FPGA). Although only one processor 191 is illustrated in FIG. 3, embodiments are not limited thereto and more than one processors may be provided to control the operation of the AR device 100.

The interface 192 through which external data or an operation command is input/output may include a user interface such as a touchpad that may be operated by a user, a controller, or an operation button. In an embodiment, the interface 192 may include a wired communication module such as a universal serial bus (USB) module or a wireless communication module such as a Bluetooth module, and may receive data of a virtual image or operation information of the user transmitted from an interface included in an external device through the wired communication module or the wireless communication module.

The memory 193 may include an internal memory such as a volatile memory or a non-volatile memory. The memory 193 may store various data for driving and controlling the AR device 100 under the control of the processor 191, a program or an application, and a signal or data of a virtual image that is input/output.

The optical engine 120 configured to receive image data generated by the processor 191 and generate light of a virtual image includes the left-eye optical engine 120L and the right-eye optical engine 120R. Each of the left-eye optical engine 120L and the right-eye optical engine 120R includes a light source that outputs light and an image panel that forms a virtual image by using the light output from the light source, and has the same function as a small projector. The light source may be, for example, a light-emitting diode (LED), and the image panel may be, for example, a digital micromirror device (DMD).

The polarization converter 150 configured to convert a polarization direction of light of a real scene according to a control signal of the processor 191 includes a left-eye polarization converter 150L and a right-eye polarization converter 150R. Each of the left-eye polarization converter 150L and the right-eye polarization converter 150R may include an optically active material whose optical properties are changed according to an applied electric field, and may be, for example, a liquid crystal panel. As described below, the polarization converter 150 transmits or blocks light of a real scene along with the first and second polarizers 158 and 159.

The focus tunable lens 160 having a focal length changed by a control signal of the processor 191 includes a left-eye focus tunable lens 160L and a right-eye focus tunable lens 160R. Each of the left-eye focus tunable lens 160L and the right-eye focus tunable lens 160R may be configured so that a refractive index or a refractive power varies according to an applied electric field.

Next, the optical engine 120, and the optical components 130 configured to transmit light of a virtual image generated by the optical engine 120 and light of an external scene to a user's pupils will be described in more detail. The optical engine 120 and the optical components 130 are provided as members for the user's left eye and right eye. It will be understood by one of ordinary skill in the art that because the members for the left eye and the right eye are symmetric, although one of the members (e.g., the member for the left eye) is described, the description may apply to the other member (e.g., the member for the right eye).

Figure 5:
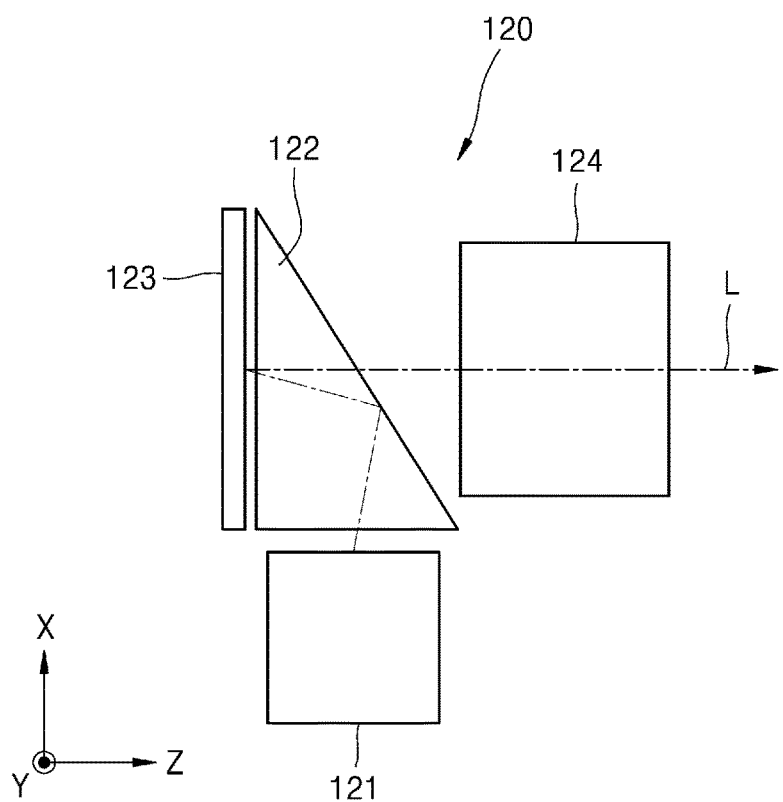
FIG. 5 is a view illustrating the optical engine according to an embodiment.

FIG. 5 is a view illustrating the optical engine 120 according to an embodiment. The optical engine 120 includes an illumination optical system 121, an image panel 123 that forms light of a virtual image by being illuminated by the illumination optical system 121, and a projection optical system 124 that projects the light of the virtual image formed on the image panel 123. The optical engine 120 of FIG. 5 using the image panel 123 that is a reflective image panel includes a beam splitter 122 that separates light from the illumination optical system 121 and light reflected by the image panel 123. When the optical engine 120 uses the image panel 123 that is a transmissive image panel, the beam splitter 122 may be omitted. The optical engine 120 may output polarized light or non-polarized light according to a method of the illumination optical system 121 or the image panel 123. For example, when the image panel 123 is a liquid crystal on silicon (LCoS) panel or other liquid crystal image panel, when a polarization beam splitter is used to separate/combine a beam, or when a light source that is highly polarized is used, the optical engine 120 may output linearly polarized light. As another example, when the image panel 123 is a DMD panel, the optical engine 120 may output non-polarized light. Although the optical engine 120 projects the light of the virtual image by using the image panel 123 in FIG. 5, the disclosure is not limited thereto. In an embodiment, the optical engine 120 may form an image by using a scanning method.

Figure 6:
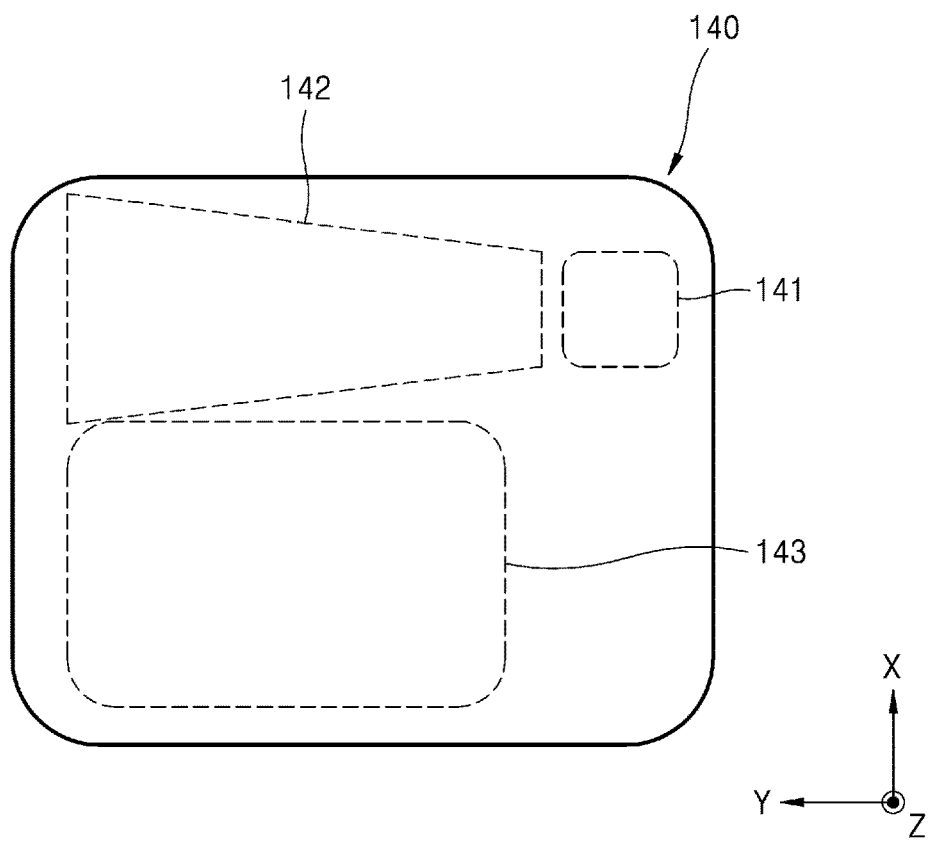
FIG. 6 is a view illustrating a waveguide according to an embodiment.

FIG. 6 is a view illustrating the waveguide 140 according to an embodiment.

Referring to FIG. 6, the waveguide 140 has a single layer or multi-layer structure formed of a transparent material in which light is reflected and propagates. The waveguide 140 may have a flat plate shape or a curved plate shape. The waveguide 140 includes a first area 141 that faces the optical engine 120 and receives projected light of a virtual image, a second area 142 in which the light of the virtual image incident on the first area 141 propagates, and a third area 143 that outputs the light of the virtual image propagating in the second area 142. The first polarizer 158 and the polarization converter 150 may contact or may be spaced apart by a predetermined interval from a front surface of the third area 143 of the waveguide 140, and the second polarizer 159 and the focus tunable lens 160 may contact or may be spaced apart by a predetermined interval from the third area 143 of a rear surface of the waveguide 140. In an embodiment, the first polarizer 158 and the polarization converter 150 may be positioned to entirely cover a front surface portion facing the third area 143 of the waveguide 140, and the second polarizer 159 and the focus tunable lens 160 may be positioned to entirely cover the third area 143 of the rear surface of the waveguide 140. In an embodiment, the first polarizer 158 and the polarization converter 150 may be positioned to cover a part of the front surface portion facing the third area 143 of the waveguide 140, and the second polarizer 159 and the focus tunable lens 160 may be positioned to cover a part of the third area 143 of the rear surface of the waveguide 140.

The waveguide 140 is mounted on the frame 111 (see FIG. 1) so that when the user wears the AR device 100, the third area 143 is positioned in front of a user's pupils. Because the waveguide 140 is formed of a transparent material, the user may see the virtual image through the AR device 100 and also a real scene, and thus the AR device 100 may create AR. The term "transparent material" refers to a material through which visible light may pass, and a transparency of the transparent material might not be 100% and the transparent material may have a predetermined color.

In an embodiment, a diffraction grating may be formed to couple light incident on the first area 141 of the rear surface of the waveguide 140 and transmit the coupled light in a first direction (e.g., an X direction). The optical engine 120 may be positioned so that emitted light is perpendicular to the first area 141 or is obliquely incident at a predetermined angle. An arrangement direction of the optical engine 120 may vary according to a pattern of the diffraction grating of the first area 141.

The second area 142 may be positioned in the first direction (e.g., a Y direction) with respect to the first area 141. A diffraction grating is formed on the second area 142 so that at least part of light received from the first area 141 propagates in a second direction (e.g., an −X direction). When the waveguide 140 has a single layer structure, the diffraction grating of the second area 142 may be formed on the same surface (i.e., the rear surface 146 of the waveguide 140) as or the opposite surface (i.e., a front surface 144 of the waveguide 140) to the diffraction grating of the first area 141. Alternatively, when the waveguide 140 has a multi-layer structure, the diffraction grating of the second area 142 may be formed on a layer different from a layer on which the diffraction grating of the first area 141 is formed. Light incident on the first area 141 is reflected and propagates between the front surface and the rear surface of the waveguide 140. Although the second area 142 is a single area in the present embodiment, the second area 142 may include a plurality of areas. When the waveguide 140 has a multi-layer structure, the second area 142 may include a plurality of areas formed on different layers.

The third area 143 may be positioned in the second direction (e.g., the −X direction) with respect to the second area 142. A diffraction grating is formed in the third area 143 so that at least part of light propagating from the second area 142 is output in a direction (e.g., a −Z direction) perpendicular to the waveguide 140 or is output in an oblique direction. When the waveguide 140 has a single layer structure, the diffraction grating of the third area 143 may be formed on the same surface as the diffraction gratings of the first and second areas 141 and 142. Alternatively, when the waveguide 140 has a multi-layer structure, the diffraction grating of the third area 143 may be formed on a layer different from a layer on which the diffraction grating of the second area 142 is formed, and may be formed on the same layer as the diffraction grating of the first area 141 or may be formed on a layer different from a layer on which the diffraction grating of the first area 141 is formed. Although the third area 143 is positioned in the second direction (e.g., the −X direction) with respect to the second area 142 in the present embodiment, the disclosure is not limited thereto. The third area 143 may be positioned in a direction (e.g., +X direction) opposite to the second direction with respect to the second area 142.

The diffraction grating of the first area 141, the diffraction grating of the second area 142, and the diffraction grating of the third area 143 may have different patterns. When the waveguide 140 has a multi-layer structure, the second area 142 may partially overlap the first area 141 and the third area 143.

Figure 7:
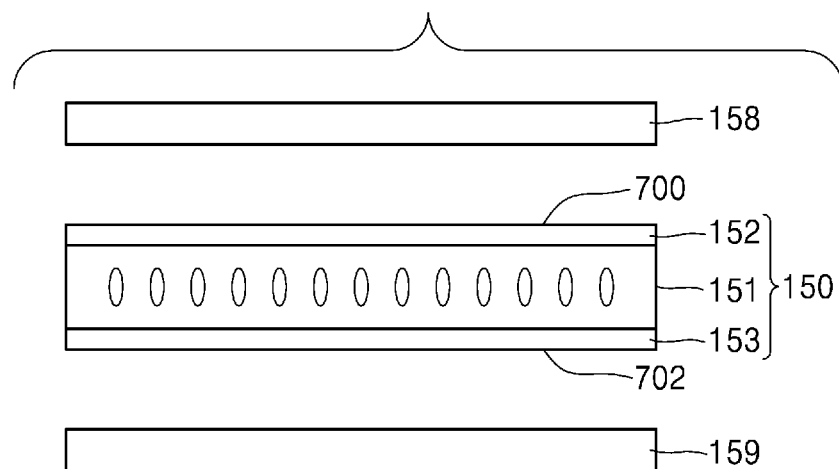
FIG. 7 is a view illustrating a first polarizer, a polarization converter, and a second polarizer according to an embodiment.

FIG. 7 is a view illustrating the first polarizer 158, the polarization converter 150, and the second polarizer 159 according to an embodiment.

Referring to FIG. 7, the polarization converter 150 may be a liquid crystal panel including a liquid crystal layer 151 in which liquid crystals are encapsulated and electrodes 152 and 153 positioned on both surfaces of the liquid crystal layer 151. The electrodes 152 and 153 may be formed of a transparent conductive material such as indium tin oxide (ITO). Regarding the liquid crystal panel, various methods such as twisted nematic (TN), vertical alignment (VA), and plane to line switching (PLS) according to an arrangement of the electrodes 152 and 153 and an arrangement method of liquid crystals are known to those skilled in the art. For example, in the TN method, liquid crystal molecules are twisted by 90° when no electric field is applied, and the liquid crystal molecules rotate in an electric field direction to be untwisted when an electric field is applied. Accordingly, when a voltage is not applied to the electrodes 152 and 153 (i.e., when the electrodes 152 and 153 are in an off state), a polarization direction of linearly polarized light incident on the liquid crystal layer 151 using the TN method rotates, and thus S-polarization becomes P-polarization and P-polarization becomes S-polarization. P-polarization in which a vibration direction of an electric field of light (i.e., an electromagnetic wave) is parallel to a plane of incidence is referred to as horizontal polarization, and S-polarization in which a vibration direction of an electric field is perpendicular to a plane of incidence is referred to as vertical polarization. When a voltage is applied to the electrodes 152 and 153 (i.e., the electrodes 152 and 153 are in an on state), linearly polarized light incident on the liquid crystal layer 151 using the TN method maintains polarization.

The first polarizer 158 and the second polarizer 159 are respectively positioned on a front surface 700 and a rear surface 702 of the polarization converter 150. Each of the first polarizer 158 and the second polarizer 159 passes therethrough only a linear polarization component of one direction from among components of incident light. When the focus tunable lens 160 includes a polarizer, the second polarizer 159 may be omitted.

An arrangement direction of the first polarizer 158 and the second polarizer 159 may vary according to a method of the polarization converter 150 or an on/off operation mode of the polarization converter 150. In the present embodiment, based on a control of the processor 191, the polarization converter 150 is an off mode, and the second polarizer 159 transmits light of a real scene. When the polarization converter 150 is in an on mode based on a control of the processor 191, the second polarizer 159 blocks the light of the real scene. A case where light is transmitted through the second polarizer 159 includes a case where only part of light or only a polarization component of light is transmitted. When the polarization converter 150 is a liquid crystal panel using a TN method in an embodiment, the first polarizer 158 and the second polarizer 159 may be positioned so that polarization directions are perpendicular to each other. For example, the first polarizer 158 may be positioned to pass only light of a P-polarization component, and the second polarizer 159 may be positioned to pass only light of an S-polarization component. When a voltage is not applied to the liquid crystal layer 151 of the polarization converter 150, light passing through the first polarizer 158 and having a first polarization direction (e.g., P-polarization) has a second polarization direction (e.g., S-polarization) perpendicular to the first polarization direction due to the polarization converter 150, and thus passes through the second polarizer 159. When a voltage is applied to the liquid crystal layer 151 of the polarization converter 150, light passing through the first polarizer 158 and having the first polarization direction (e.g., P-polarized light) maintains the first polarization direction due to the polarization converter 150, and thus is blocked by the second polarizer 159. As such, the polarization converter 150 functions as an optical shutter for the light of the real scene along with the first and second polarizers 158 and 159.

In an embodiment, each of the electrodes 152 and 153 of the polarization converter 150 may be provided as a single electrode over an entire portion, of the liquid crystal layer 151, corresponding to the first polarizer 158. In an embodiment, because one of the electrodes 152 and 153 of the polarization converter 150 is provided as a pixelated electrode and is independently controllable, the light of the real scene for only a portion corresponding to a virtual object in the real scene is selectively blocked.

Figure 8:
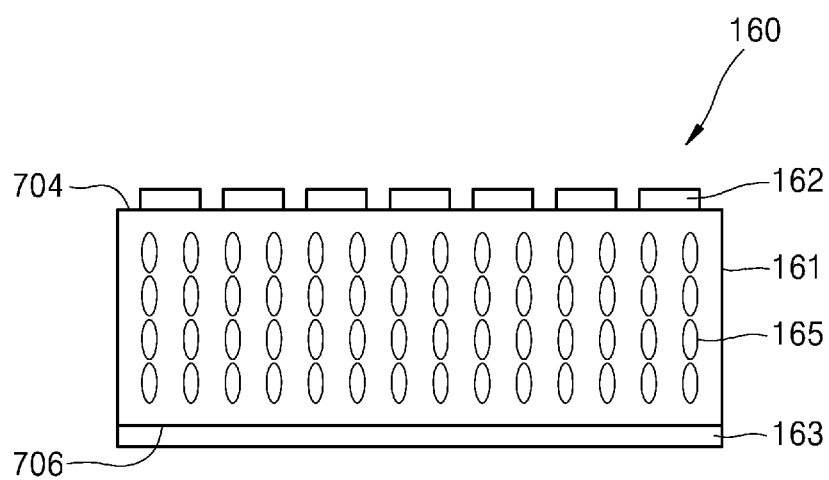
FIG. 8 is a view illustrating a focus tunable lens according to an embodiment.

FIG. 8 is a view illustrating a configuration of the focus tunable lens 160 according to an embodiment.

Referring to FIG. 8, the focus tunable lens 160 includes an electro-optical layer 161, a first electrode array 162 positioned on a first surface 704 of the electro-optical layer 161, and a second electrode 163 positioned on a second surface 706 of the electro-optical layer 161.

The electro-optical layer 161 may include an electro-optical material whose refractive index varies according to an applied electric field, that is, a material whose local effective refractive index varies as a function of a voltage applied to the entire material. The electro-optical layer 161 may have a single layer structure or a multi-layer structure divided by a plurality of insulating layers.

In an embodiment, liquid crystals in which liquid crystal molecules are rotated by an applied electric field to change an axis of birefringence and an effective refractive index may be used as the electro-optical material. In an embodiment, other materials having similar electro-optical properties to polymer gel may be used for the electro-optical layer 161.

The electro-optical material may have polarization characteristics in which a refractive index varies according to a polarization direction according to a single layer/multi-layer structure or an orientation method of liquid crystal molecules, or non-polarization characteristics. Even when the electro-optical material of the electro-optical layer 161 has polarization characteristics (e.g., when the electro-optical material is a liquid crystal material), overlapping focuses or a blurred image in the focus tunable lens 160 may be prevented by limiting a polarization direction of incident light by using the second polarizer 159 (see FIG. 7).

The first electrode array 162 and the second electrode 163 may be formed of a transparent conductive material such as ITO. The first electrode array 162 may be an electrode array that operates individually or in groups. The first electrode array 162 is patterned as a series of concentric arrays or pixel arrays, and is used to apply a desired voltage so that an effective refractive index is adjusted to a locally desired value. The electro-optical layer 161 may provide a phase modulation profile having a desired focal length by locally adjusting the effective refractive index. The second electrode 163 may function as a reference electrode with respect to the first electrode array 162. When necessary, the second electrode 163 may be implemented as an electrode array. Positions of the first electrode array 162 and the second electrode 163 may be changed each other.

In an embodiment, the second polarizer 159 and the focus tunable lens 160 may be spaced apart from each other or may contact each other. In an embodiment, the second polarizer 159 and the focus tunable lens 160 may be integrally formed with each other, and the second polarizer 159 may be a component of the focus tunable lens 160.

Although the focus tunable lens 160 may have a refractive power of 0 (i.e., an infinite focal length) in an off mode in an embodiment, the disclosure is not limited thereto and the focus tunable lens 160 may have a refractive power even in the off mode according to a single/multi-layer structure or a shape of the electro-optical layer 161. The following will be described as assuming that a refractive power of the focus tunable lens 160 is 0 in an off mode.

Figure 9:
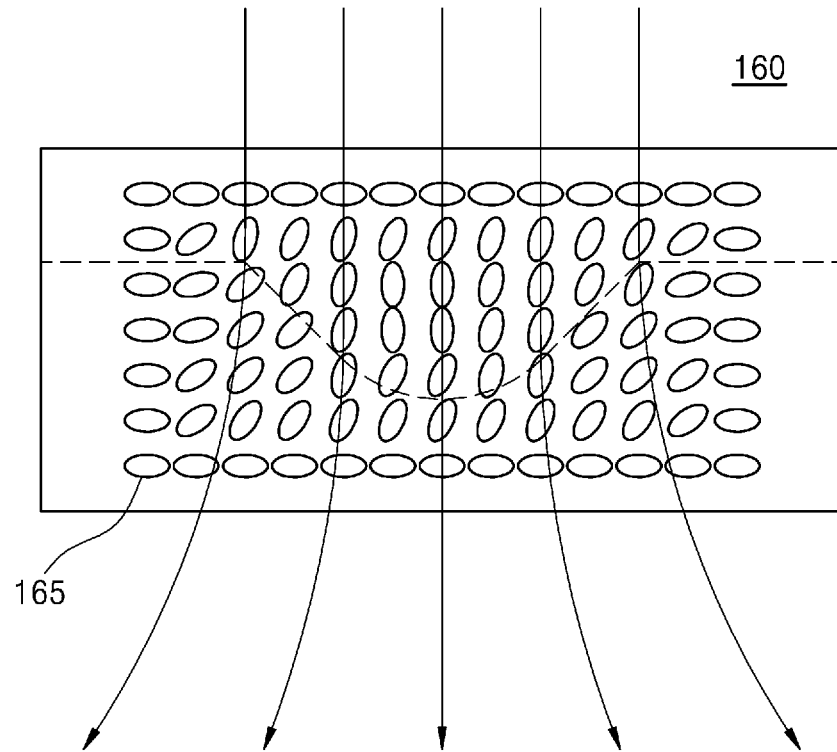
FIG. 9 is a view for describing a diverging operation of a focus tunable lens.
Figure 10:
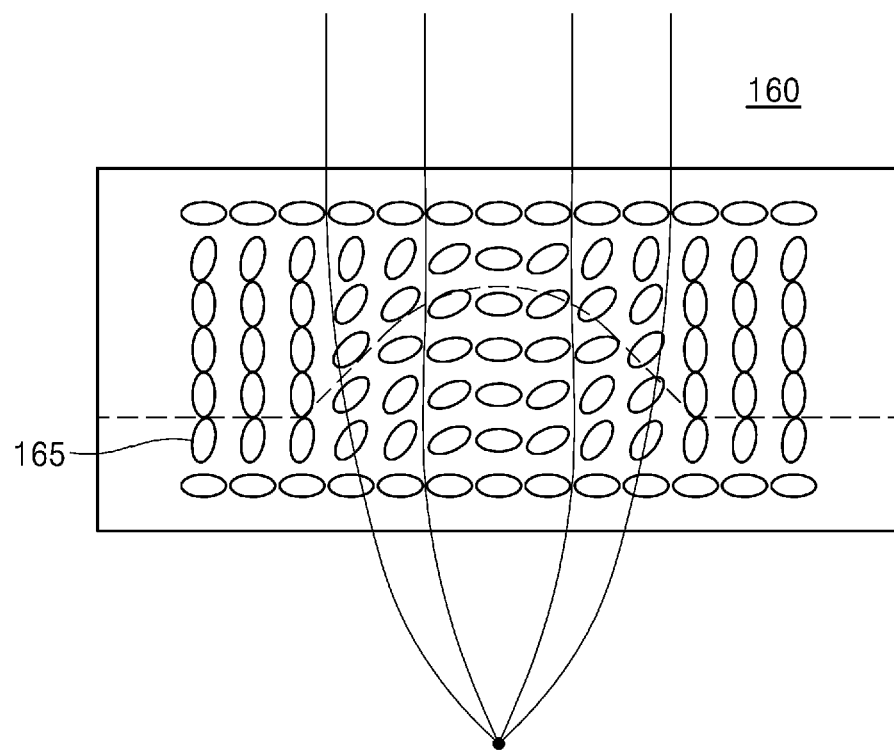
FIG. 10 is a view for describing a verging operation of the focus tunable lens.

FIG. 9 is a view for describing a diverging operation of a focus tunable lens. FIG. 10 is a view for describing a converging operation of the focus tunable lens. Referring to FIGS. 9 and 10, when a voltage is applied to the electro-optical layer 161 of the focus tunable lens 160, an effective refractive index may be locally changed, and thus a path of light passing through the focus tunable lens 160 may be changed, thereby changing a vergence. The vergence is an index indicating a degree to which light transmitted through the focus tunable lens 160 converges or diverges. The vergence may be adjusted according to a refractive power of the focus tunable lens 160. In an embodiment of FIG. 9, light passing through a portion where optical properties of the electro-optical layer 161, e.g., in the case of a liquid crystal layer, an arrangement angle of liquid crystal molecules 165 are changed may form a positive vergence, and thus the focus tunable lens 160 may perform the same function as a convex lens. Once the positive vergence is formed, a focal length may be shortened. In an embodiment of FIG. 10, light passing through a portion where optical properties of the electro-optical layer 161, e.g., in the case of a liquid crystal layer, an arrangement angle of the liquid crystal molecules 165 are changed may form a negative vergence, and thus the focus tunable lens 160 may perform the same function as a concave lens. When the negative vergence is formed, a focal length may be lengthened.

An operation of the AR device 100 of an embodiment will be described with reference to FIGS. 11 through 14.

Figure 11:
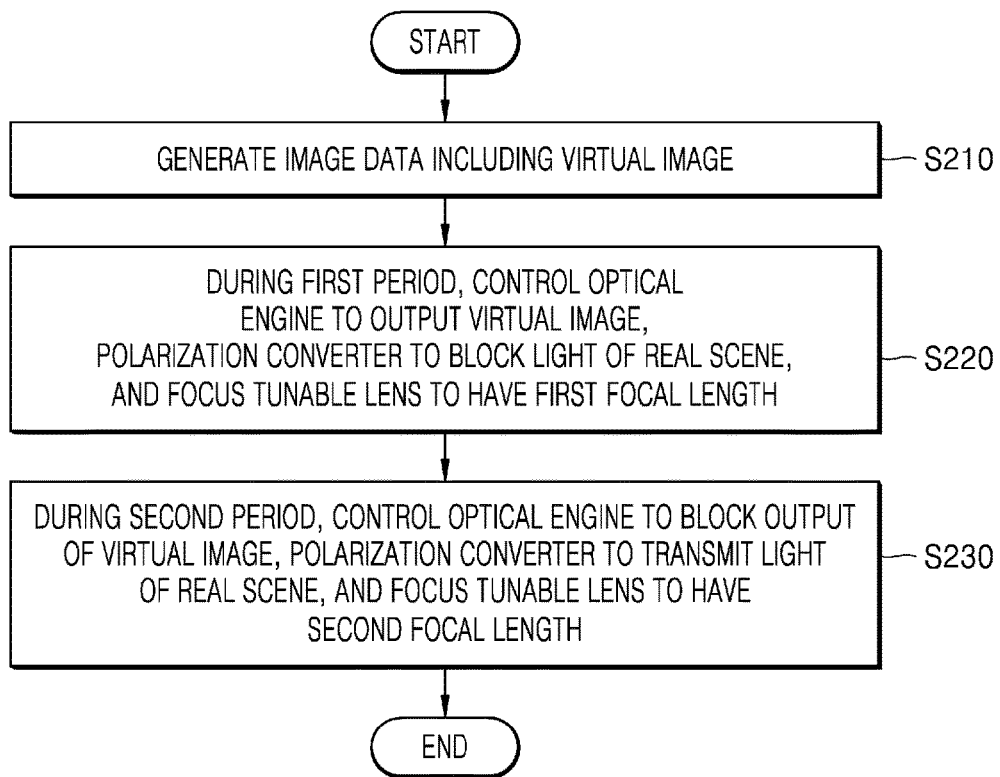
FIG. 11 is a flowchart for describing an operation of the AR device according to an embodiment.
Figure 12:
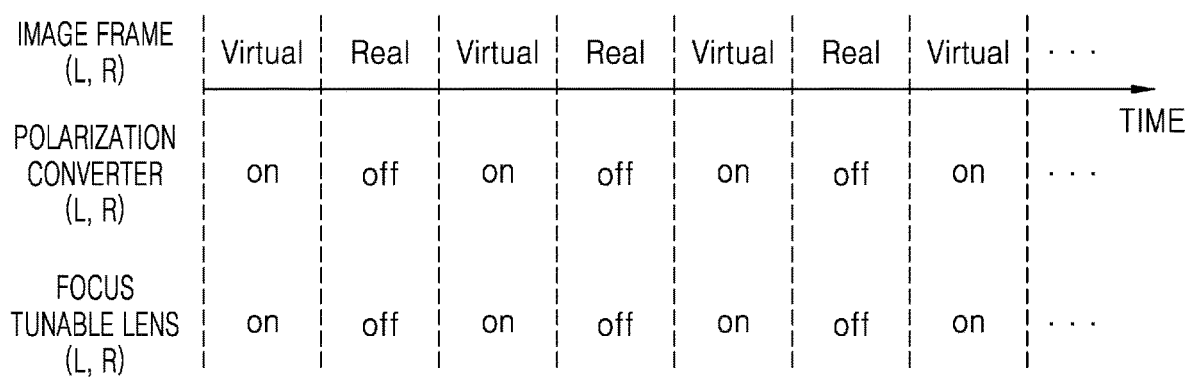
FIG. 12 is a view for describing an operation according to an AR image sequentially generated by the AR device according to an embodiment.
Figure 13:
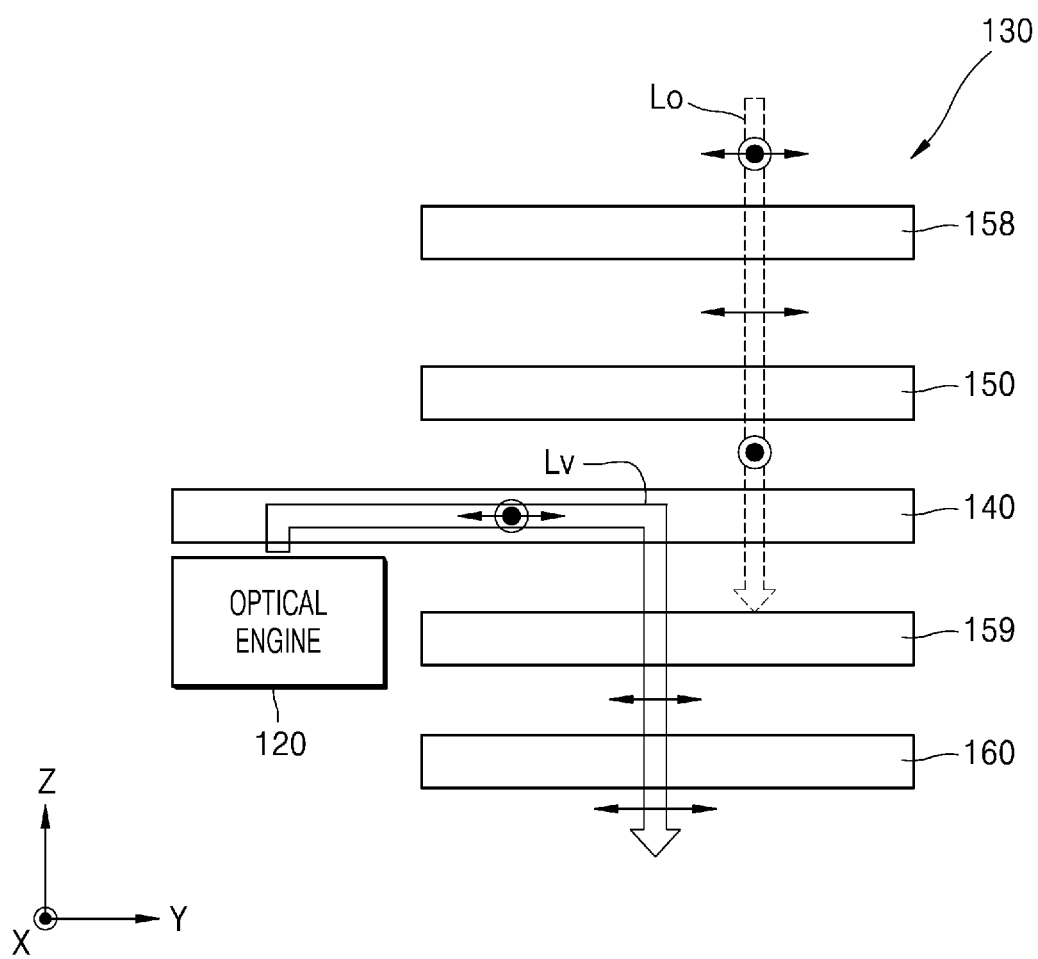
FIG. 13 is a view for describing an operation of the AR device during a first period according to an embodiment.
Figure 14:
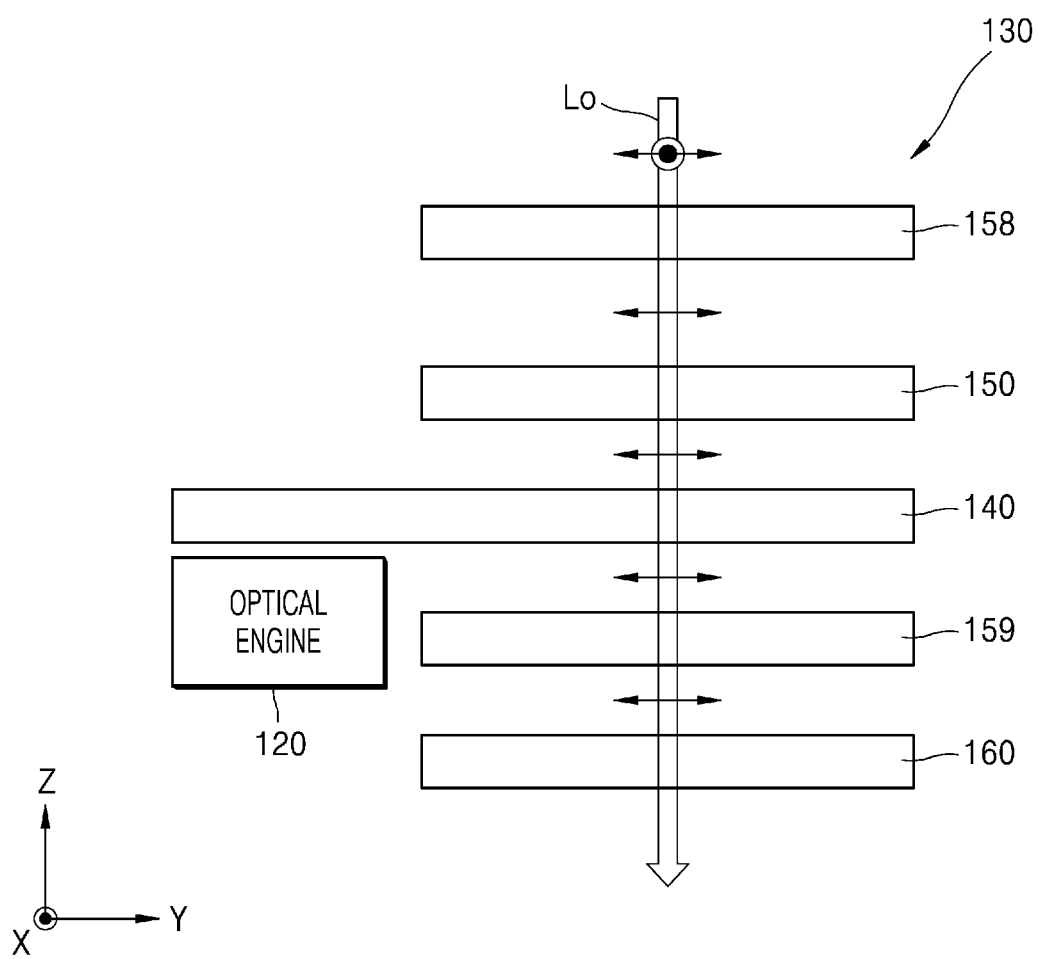
FIG. 14 is a view for describing an operation of the AR device during a second period according to an embodiment.

FIG. 11 is a flowchart for describing an operation of the AR device 100 according to an embodiment. FIG. 12 is a view for describing an operation according to an AR image sequentially generated by the AR device 100 according to an embodiment. FIG. 13 is a view for describing an operation of the AR device 100 during a first period according to an embodiment. FIG. 14 is a view for describing an operation of the AR device 100 during a second period according to an embodiment.

Referring to FIGS. 3 and 11 through 14, in operation S210, the processor 191 according to an embodiment generates image data including a virtual image based on data received through the interface 192 or data stored in the memory 193. The virtual image includes a left-eye virtual image and a right-eye virtual image having a binocular disparity. A depth of the virtual image is provided from the binocular disparity. The left-eye virtual image and the right-eye virtual image having the binocular disparity may be provided from original data, or may be generated by the processor 191 according to settings of an AR device 100.

The image data including the virtual image may be image data that is time divided by temporally alternating a first period for outputting the virtual image and a second period for not outputting the virtual image. Because an image is typically generated in units of frames and displayed, the image data including the virtual image may have a structure in which one or more consecutive first frames (Virtual in FIG. 12) of the first period and one or more consecutive second frames (Real in FIG. 12) of the second period subsequent to the first period are alternated. The first frames (Virtual) may contain the virtual image.

In an embodiment, the second frames (Real) are in a blank state like null data, and the processor 191 may control the optical engine 120 not to output light in the second frames (Real).

In an embodiment, the second frames (Real) may contain a transparent image, and the processor 191 may control the optical engine 120 to output light of the transparent image in the second frames (Real).

In an embodiment, the second frames (Real) may contain the virtual image, and when a brightness is zero or there is separate light source on/off control information, the processor 191 may control a light source of the optical engine 120 to be turned on/off in the second frames (Real), thereby controlling the optical engine 120 not to output light of the virtual image.

In an embodiment, the processor 191 may maintain the second period without providing the virtual image, or may maintain the first period by continuously providing the virtual image.

In operation S220, during the first period, the processor 191 controls the optical engine 120 to output light Lv of the virtual image, controls the polarization converter 150 to be turned on so that light Lo of a real scene does not reach the focus tunable lens 160, and controls the focus tunable lens 160 to be turned on to have a first focal length.

As shown in FIG. 13, the light Lo of the real scene may be non-polarized light, and only light incident on the first polarizer 158 and having a first polarization component (e.g., a P-polarization component) passes. The light Lo of the real scene of the first polarization component is incident on the polarization converter 150. When the processor 191 controls the polarization converter 150 to be turned on, liquid crystals may be aligned according to an applied electric field, and light of the first polarization component passes through the polarization converter 150 while maintaining a polarization direction and reaches the second polarizer 159 through the waveguide 140. However, because a second polarization direction (e.g., S-polarization) of the second polarizer 159 is perpendicular to a first polarization direction of the first polarizer 158, the light of the first polarization component of the real scene is blocked by the second polarizer 159, thereby preventing a user from seeing the real scene.

When the processor 191 controls the optical engine 120 to output the light Lv of the virtual image, the light Lv of the virtual image output from the optical engine 120 is transmitted through the waveguide 140 to the second polarizer 159. Only light of a second polarization component (e.g., an S-polarization component) of the light Lv of the virtual image passes through the second polarizer 159. In an embodiment, when the optical engine 120 outputs non-polarized light, light of a polarization component (i.e., second polarization) of the same direction as the second polarization direction (e.g., S-polarization) of the second polarizer 159 may reach the user's pupils, thereby enabling the user to see the virtual image. In an embodiment, when the optical engine 120 outputs light of specific polarization, the optical engine 120 may cause the light Lv to have the same polarization direction as the second polarization direction (e.g., S-polarization) of the second polarizer 159, thereby removing or reducing light loss.

The processor 191 may control the focus tunable lens 160 to have a first focal length according to a depth of the virtual image, and thus the user may see the virtual image according to the depth. That is, when the user sees the left-eye virtual image and the right-eye virtual image, the user perceives the depth of the virtual image due to a binocular disparity θV of the left-eye virtual image and the right-eye virtual image, and the processor 191 controls the focus tunable lens 160 according to the first focal length so that an eye lens of the user's eyeball has a focal length $f_2$ (see FIG. 16) corresponding to the depth of the virtual image. In this case, the first focal length refers to a focal length of the focus tunable lens 160 for adjusting a vergence of the focus tunable lens 160 so that a focal length of the eye lens of the user corresponds to the depth of the virtual image.

The second period is subsequent to the first period. In operation S230, during the second period, the processor 191 controls the optical engine 120 not to output the light Lv of the virtual image, controls the polarization converter 150 to be turned off so that the light Lo of the real scene reaches the focus tunable lens 160, and controls the focus tunable lens 160 to be turned off to have a second focal length.

As shown in FIG. 14, the light Lo of the real scene may be non-polarized light, and light incident on the first polarizer 158 and having the first polarization component (e.g., the P-polarization component) passes. The light Lo of the real scene of the first polarization component is incident on the polarization converter 150. When the processor 191 controls the polarization converter 150 to be turned off, liquid crystals in the polarization converter 150 return to an original orientation state, and a polarization direction of the light Lo of the real scene is rotated by 90° to have the second polarization direction (e.g., S-polarization). Accordingly, the light Lo of the real scene passing through the polarization converter 150 passes in a second polarization state through the waveguide 140 and reaches the second polarizer 159. However, because the second polarization direction of the second polarizer 159 is perpendicular to the first polarization direction of the first polarizer 158, the light Lo of the second polarization component of the real scene passes through the second polarizer 159 and is incident on the focus tunable lens 160. When the processor 191 controls the focus tunable lens 160 to be turned off, the focus tunable lens 160 might not have a refractive power and the second focal length is infinite. That is, when the focus tunable lens 160 is controlled to be turned off, a vergence of the focus tunable lens 160 does not converge or diverge. Accordingly, light (i.e., light of the real scene) of the second polarization component incident on the focus tunable lens 160 that is controlled to be turned off passes without changing a vergence, and travels to the user's pupil. Because a vergence is not changed for the light of the real scene, the user may see the real scene itself. Although the focus tunable lens 160 is controlled to be turned off when the real scene is seen for convenience of explanation, the disclosure is not limited thereto. For example, when the user has myopia or hyperopia and needs a corrective lens, the focus tunable lens 160 may be controlled to have a correction focal length (the second focal length) and may function as the corrective lens.

The user may see the virtual image through the AR device 100 during the first period and may see the real scene through the AR device 100 during the second period. The first period and the second period may alternately continue. Although there is first the first period and then there is the second period in the present embodiment, the disclosure is not limited thereto. In an embodiment, there may be first the second period and then there may be the first period. The first period and the second period may be the same time interval, but the disclosure is not limited thereto. The first period and the second period may be different time intervals. Furthermore, a time interval of the second period and a time interval of the first period may vary according to circumstances.

The virtual image may be an image that is overlaid on the real scene and shows information about a real world object in the real scene, information about an operation of an AR device, a control menu, etc. The virtual image may have a depth. When the left-eye virtual image and the right-eye virtual image are generated to have a binocular disparity, the depth of the virtual image may be a distance calculated from the binocular disparity. For example, the virtual image may have a depth corresponding to a distance of the real world object on which the virtual image is overlaid so that when the user gazes at the real world object, the virtual image (i.e., a virtual object) is located at or near to a position of the real world object. Of course, the depth of the virtual image may be set regardless of the real world object.

During a second period, the processor 191 controls the optical engine 120 not to output light of the virtual image, controls the polarization converter 150 to transmit light of the real scene, and controls the focus tunable lens 160 to have the second focal length. The first focal length and the second focal length may be different values. The second focal length may be infinite (i.e., a refractive power of the focus tunable lens 160 may be 0). When the user has myopia or hyperopia and needs vision correction, the second focal length may be a focal length of a corrective lens.

A focus adjusting function of the focus tunable lens 160 in the AR device 100 of the present embodiment will be described with reference to FIGS. 15 through 17.

Figure 15:
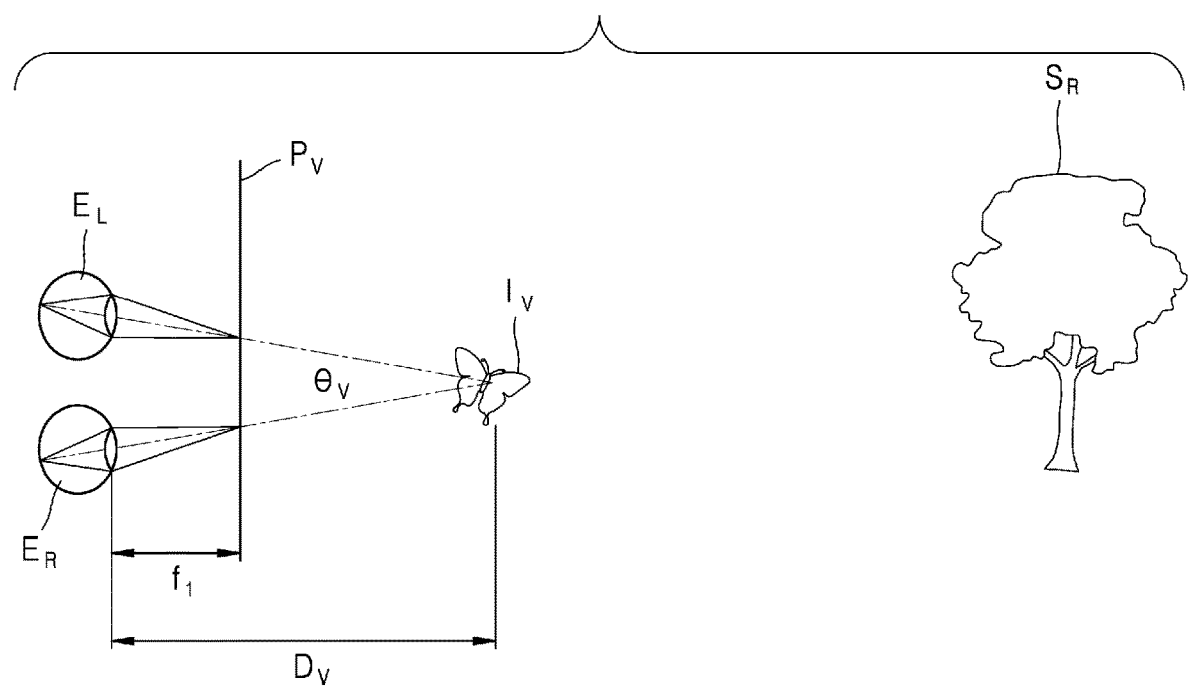
FIG. 15 is a view for describing vergence-accommodation conflict in an AR device of a comparative example.

FIG. 15 is a view for describing vergence-accommodation conflict in an AR device of a comparative example. FIG. 16 is a view for describing an operation of a focus tunable lens at a depth of a virtual image in an AR device according to an embodiment. FIG. 17 is a view for describing a case where a user sees a real scene through an AR device according to an embodiment.

Referring to FIG. 15, in the AR device of the comparative example with no focus tunable lens 160, when a user sees a left-eye virtual image and a right-eye virtual image, the user perceives a depth $D_V$ of a virtual image $I_V$ due to a binocular disparity $\theta_V$ of the left-eye virtual image and the right-eye virtual image. That is, the depth $D_V$ of the virtual image $I_V$ that is a distance or a depth at which the user perceives the virtual image $I_V$ in a space when the user sees the virtual image $I_V$ and the depth $D_V$ of the virtual image $I_V$ may be back-calculated from the binocular disparity $\theta_V$. Because the left-eye virtual image and the right-eye virtual image are output from the third area 143 of the waveguide 140, the user adjusts a focal length $f_1$ of an eye lens to an image plane $P_V$ of the virtual image $I_V$ output from the waveguide 140. The image plane $P_V$ of the virtual image $I_V$ may be formed on the third area 143 of the waveguide 140, but the disclosure is not limited thereto.

Because the focal length $f_1$ of the eye lens of the user and the depth $D_V$ of the virtual image $I_V$ perceived due to the binocular disparity $\theta_V$ are different from each other, the user suffers vergence-accommodation conflict.

Figure 16:
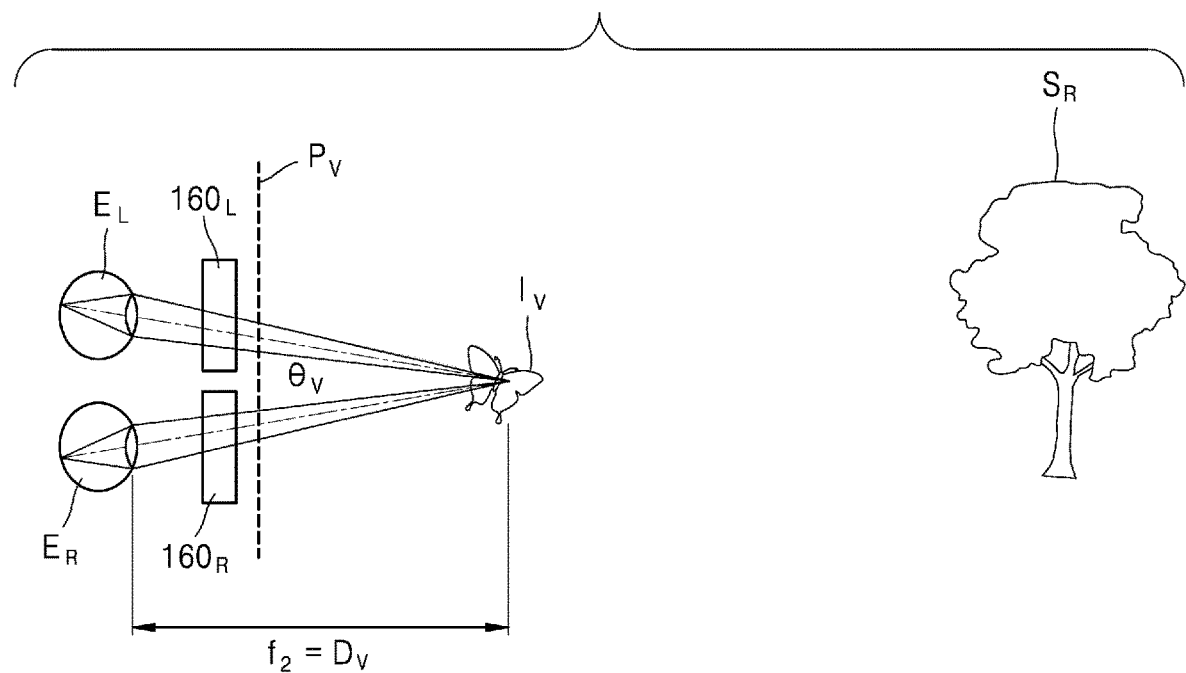
FIG. 16 is a view for describing an operation of a focus tunable lens at a depth of a virtual image in an AR device according to an embodiment.

In contrast, referring to FIG. 16, in the AR device 100 of the present embodiment, the processor 191 adjusts a vergence of the focus tunable lens 160 so that the AR device 100 causes a focal length of the eye lens of the user to be a focal length $f_2$ corresponding to the depth $D_V$ of the virtual image $I_V$. In other words, because the vergence of the focus tunable lens 160 is adjusted, the user may cause the focal length $f_2$ to be the same as a vergence distance (i.e., the depth $D_V$ of the virtual image), thereby preventing vergence-accommodation conflict.

Figure 17:
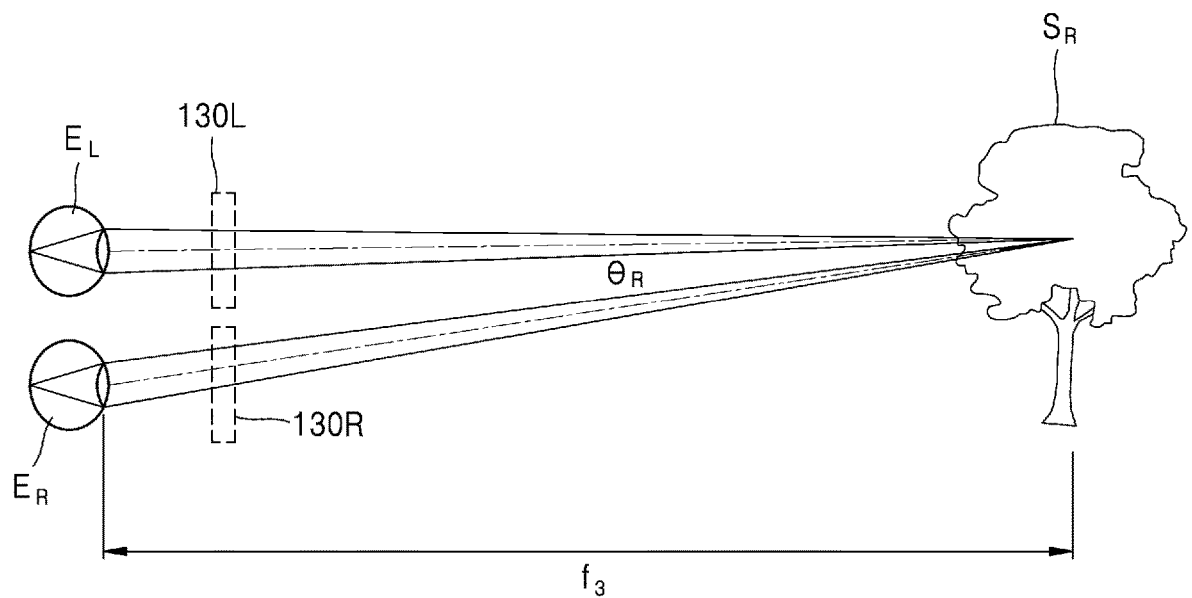
FIG. 17 is a view for describing a case where a user sees a real scene through an AR device according to an embodiment.

Referring to FIG. 17, when the user sees a real scene $S_R$, because the focus tunable lens 160 is in an off state, a vergence of the focus tunable lens 160 is 0. Accordingly, the user may see the real scene $S_R$ without distortion. Also, because a focal length $f_3$ of the eye lens is the same as a distance (i.e., a depth of the real scene $S_R$) due to the binocular disparity $\theta_R$ occurring when the real scene $S_R$ is seen, vergence-accommodation conflict is prevented.

Figure 18:
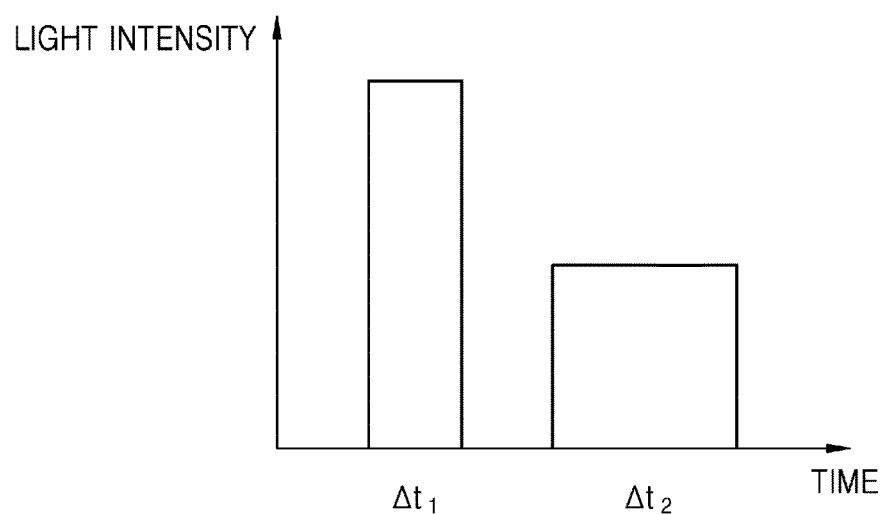
FIG. 18 is a view for describing a principle based on which the AR device adjusts a brightness of a virtual image and a brightness of a real scene according to an embodiment.

FIG. 18 is a view for describing a principle based on which the AR device 100 adjusts a brightness of a virtual image and a brightness of a real scene according to an embodiment.

When an external environment is a bright daytime outdoor environment, a dark evening outdoor environment, or an indoor environment, the amount of light of a real scene entering the user's eyes is greatly different. In an embodiment, the AR device 100 may include an illuminance sensor, and the processor 191 may adjust the amount of light of a real scene and the amount of light of a virtual image by detecting an external brightness sensed by the illuminance sensor and adjusting a time division ratio of a first period $\Delta t_1$ and a second period $\Delta t_2$ of image data based on the external brightness. When an external environment is a too bright daytime outdoor environment, the second period $\Delta t_2$ for transmitting light of the real scene may be reduced and the first period $\Delta t_1$ for displaying the virtual image may be increased.

In the AR device 100 according to an embodiment, the processor 191 may adjust the amount of light of the virtual image by appropriately controlling an intensity of a light source of the optical engine 120 during the first period.

In the AR device 100 according to an embodiment, the processor 191 may adjust the amount of light of the real scene by converting only a part of a first polarization component of light of the real scent incident on the polarization converter 150 into a second polarization component by applying a lower voltage, instead of turning off the polarization converter 150 in the second period.

In the AR device 100 according to an embodiment, the processor 191 may adjust the amount of light of the real scene and the amount of light of the virtual image by adjusting at least two from among an intensity of the light source of the optical engine 120, an intensity of a voltage applied to the polarization converter 150, and a time division ratio between the first period and the second period.

Figure 19:
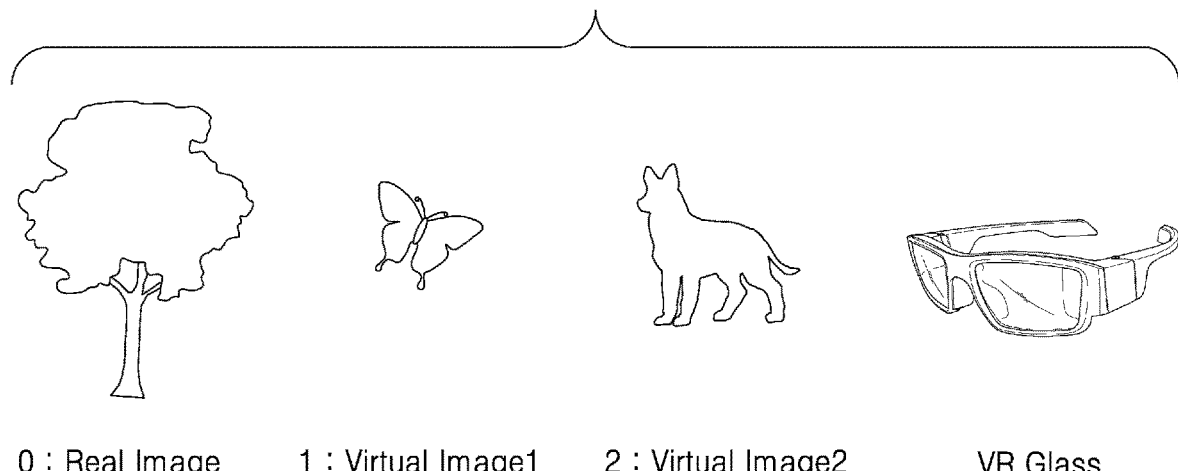
FIG. 19 is a view illustrating an AR image having multiple depths in the AR device according to an embodiment.
Figure 20:
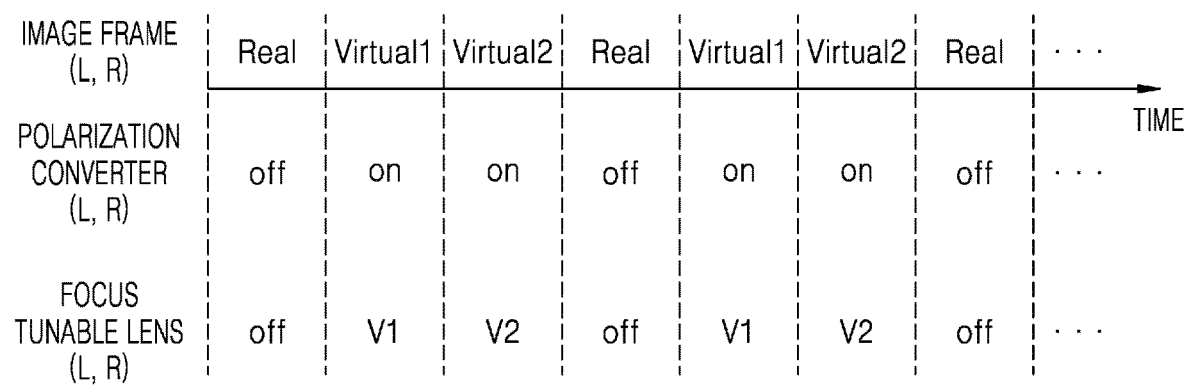
FIG. 20 is a view for describing an operation according to an AR image having multiple depths and sequentially generated in the AR device according to an embodiment.

FIG. 19 is a view illustrating an AR image having multiple depths in the AR device 100 according to an embodiment. FIG. 20 is a view for describing an operation according to an AR image having multiple depths and sequentially generated in the AR device 100 according to an embodiment.

Referring to FIGS. 19 and 20, in the AR device 100, a virtual image overlaid on a real scene may include first and second virtual image layers Virtual1 and Virtual2 having different depths. The first virtual image layer Virtual1 may include a first left-eye virtual image layer and a first right-eye virtual image layer having a first binocular disparity. The second virtual image layer Virtual2 may include a second left-eye virtual image layer and a second right-eye virtual image layer having a second binocular disparity. The first binocular disparity and the second binocular disparity may be different values.

In a second period, the processor 191 of the AR device 100 controls both the polarization converter 150 and the focus tunable lens 160 to be turned off and the optical engine 120 not to output light of a virtual image. As the polarization converter 150 is controlled to be turned off, light of a real scene is incident through the polarization converter 150 and the focus tunable lens 160 on a user's eyeball. As the focus tunable lens 160 is controlled to be turned off, a user may see the real scene without distortion.

In a first virtual period subsequent to the second period, the processor 191 of the AR device 100 controls both the polarization converter 150 and the focus tunable lens 160 to be turned on and the optical engine 120 to output light of the first virtual image layer Virtual1. In this case, the processor 191 controls the focus tunable lens 160 at a first voltage V1 and adjusts a vergence of the focus tunable lens 160 so that the user's eye lens has a focal length corresponding to a depth of the first virtual image layer Virtual1. As the polarization converter 150 is controlled to be turned on, light of the real scene is blocked by the second polarizer 159, and the light of the first virtual image layer Virtual1 is incident through the waveguide 140 and the focus tunable lens 160 on the user's eyeball. As the focus tunable lens 160 is controlled at the first voltage V1, the user may see the first virtual image layer Virtual1 at the depth of the first virtual image layer Virtual1.

In a second virtual period subsequent to the first virtual period, the processor 191 of the AR device 100 controls both the polarization converter 150 and the focus tunable lens 160 to be turned on and the optical engine 120 to output light of the second virtual image layer Virtual2. In this case, the processor 191 controls the focus tunable lens 160 at a second voltage V2 and adjusts a vergence of the focus tunable lens 160 so that the user's eye lens has a focal length corresponding to a depth of the second virtual image layer Virtual2. As the polarization converter 150 is controlled to be turned on, light of the real scene is blocked by the second polarizer 159 and the light of the second virtual image layer Virtual2 is incident through the waveguide 140 and the focus tunable lens 160 on the user's eyeball. As the focus tunable lens 160 is controlled at the second voltage V2, the user may see the second virtual image layer Virtual2 at the depth of the second virtual image layer Virtual2.

The processor 191 may generate image data to repeat the second period, the first virtual period, and the second virtual period, and may control the optical engine 120, the polarization converter 150, and the focus tunable lens 160. Although an order, a frequency, and a time interval of the second period, the first virtual period, and the second virtual period may be fixed, the disclosure is not limited thereto. When the user manipulates the interface 192 according to the first virtual image layer, a time interval or a frequency of the first virtual period may be increased. A method of increasing a frequency of the first virtual period will be described with reference to, for example, FIG. 36 or 37.

Figure 21:
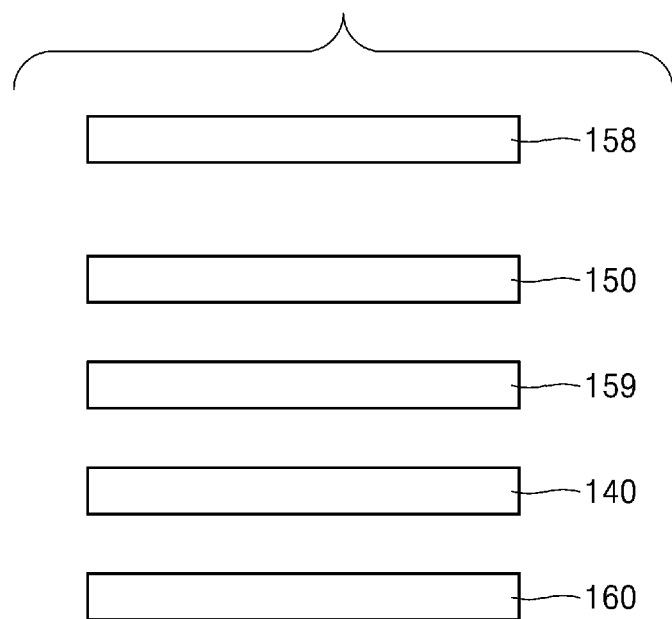
FIG. 21 is a view illustrating an arrangement of optical components in an AR device according to an embodiment.

Although the second polarizer 159 is positioned between the waveguide 140 and the focus tunable lens 160 in the above-described embodiments of the disclosure, the disclosure is not limited thereto. FIG. 21 is a view illustrating an arrangement of optical components in an AR device according to an embodiment. Referring to FIG. 21, the second polarizer 159 may be positioned between the polarization converter 150 and the waveguide 140. In an embodiment, the focus tunable lens 160 may be a lens having a polarization-independent refractive power. In an embodiment, the focus tunable lens 160 may be a liquid crystal lens having a polarization-dependent refractive power, and, in this case, the optical engine 120 may be configured to emit light of a specific polarization or an additional polarizer may be provided between the waveguide 140 and the focus tunable lens 160. In an embodiment, when the focus tunable lens 160 has a polarization-dependent refractive power, the focus tunable lens 160 may include a polarizer incorporated therein.

Figure 22:
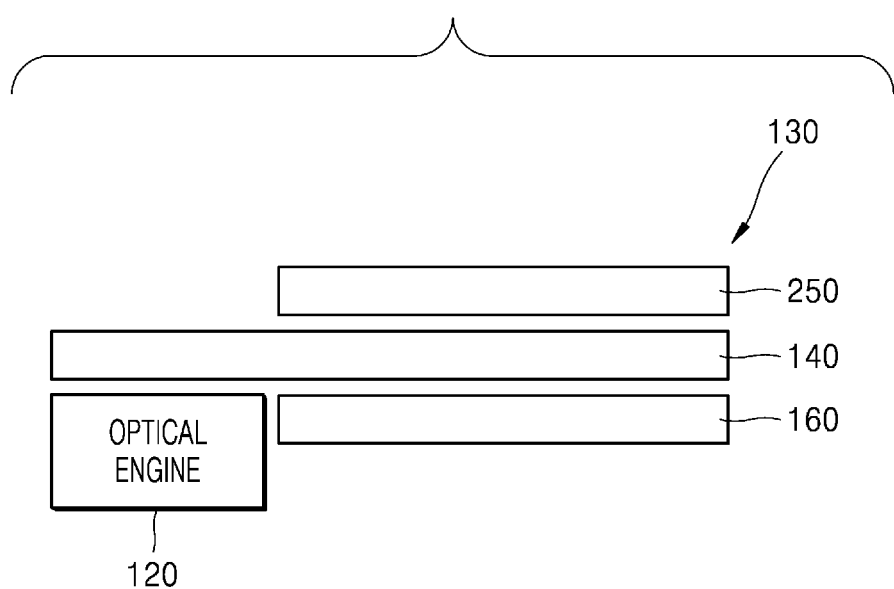
FIG. 22 is a view illustrating an arrangement of optical components in an AR device according to an embodiment.

Although light of a real scene is blocked or transmitted by a combination of the polarization converter 150, the first polarizer 158, and the second polarizer 159 in the above-described embodiments of the disclosure, the disclosure is not limited thereto. FIG. 22 is a view illustrating an arrangement of optical components 130 in an AR device according to an embodiment. Referring to FIG. 22, the optical components 130 in the AR device of the present embodiment may include the waveguide 140, an optical shutter 250 contacting or spaced apart by a predetermined interval from a front surface of the third area 143 of the waveguide 140, and the focus tunable lens 160 contacting or spaced apart by a predetermined interval from the third area 143 of the waveguide 140. The processor 191 controls the optical shutter 250 to block or transmit light of the real scene.

Figure 23:
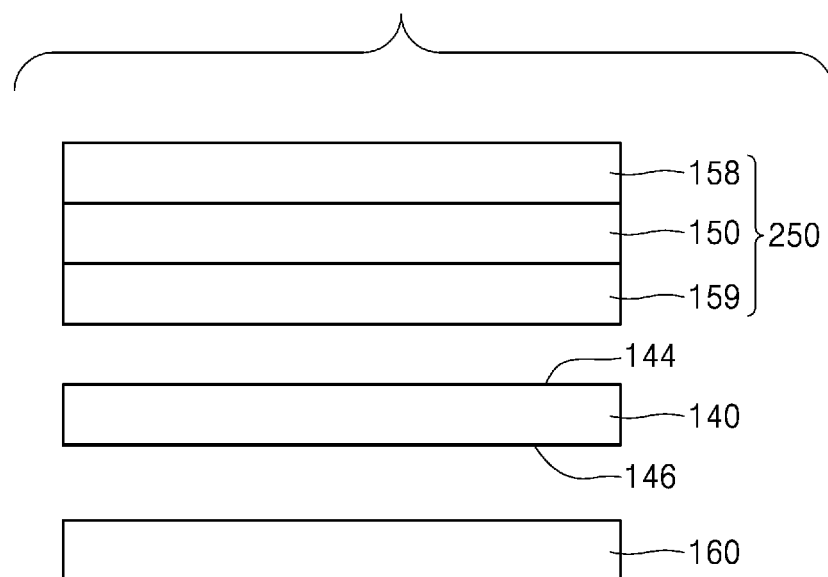
FIG. 23 is a view illustrating a configuration of an optical shutter according to an embodiment.

FIG. 23 is a view illustrating a configuration of the optical shutter 250 according to an embodiment. Referring to FIG. 23, the optical shutter 250 may be a liquid crystal optical shutter including the polarization converter 150 and the first and second polarizers 158 and 159, and may be positioned on the front surface of the waveguide 140. The optical shutter 250 may be implemented by integrally manufacturing the polarization converter 150 and the first and second polarizers 158 and 159.

Figure 24:
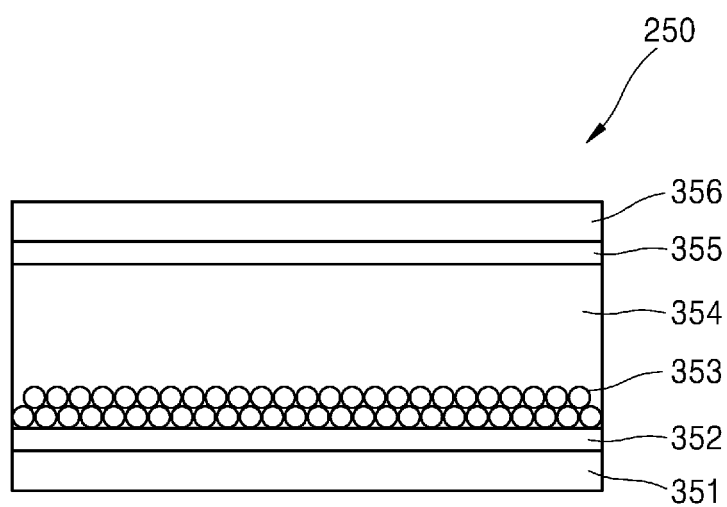
FIG. 24 is a view illustrating a configuration of an optical shutter according to an embodiment.

FIG. 24 is a view illustrating a configuration of an optical shutter 250 according to an embodiment. Referring to FIG. 24, the optical shutter 250 is an electrochromic optical shutter including a first transparent electrode 352, an electrochromic layer 353, an electrolytic layer 354, and a second transparent electrode 355 which are positioned between two transparent substrates 351 and 356 facing each other.

The electrochromic layer 353 includes electrochromic particles. The electrochromic particles are particles whose light transmission characteristics are changed by oxidation-reduction according to whether power is supplied. In an embodiment, the electrochromic particles may include a support and an electrochromic material surrounding the support. In an embodiment, the support may include a porous material to improve chromism characteristics of the electrochromic material. In an embodiment, the support may include a transparent conductive oxide such as indium oxide ($In_2O_3$), tin oxide ($SnO_2$), ITO, indium zinc oxide (IZO), antimony-tin-oxide (ATO), fluorine-doped tin-oxide (FTO), or aluminum-zinc oxide (AZO) to improve electron mobility. In an embodiment, the support may include a non-conductive metal oxide having a high transmittance to visible rays and a large specific surface area such as titanium oxide ($TiO_2$), zinc oxide (ZnO), or silica ($SiO_2$). In an embodiment, the electrochromic material may include a viologen derivative such as methyl viologen, ethyl viologen, or benzyl viologen, and may be formed of another organic material such as phosphonic acid derivative or pyridine or an inorganic material such as a transition metal oxide such as tungsten oxide. The support and the electrochromic material are not limited to the above materials. The electrochromic layer 353 may be divided into an oxidation coloration material layer and a reduction coloration material layer with the electrolytic layer 354 therebetween. The electrochromic layer 353 may be in a transparent state initially (i.e., when power is not supplied) and may be in a light-blocking state absorbing light when power is supplied. The optical shutter 250 that is an electrochromic optical shutter may be used instead of the optical shutter 250 that is a liquid crystal optical shutter. Because the optical shutter 250 that is an electrochormic optical shutter is independent of polarization, the optical shutter 250 may reduce loss of external light (i.e., light of a real scene) as compared to a method using polarization.

Figure 25:
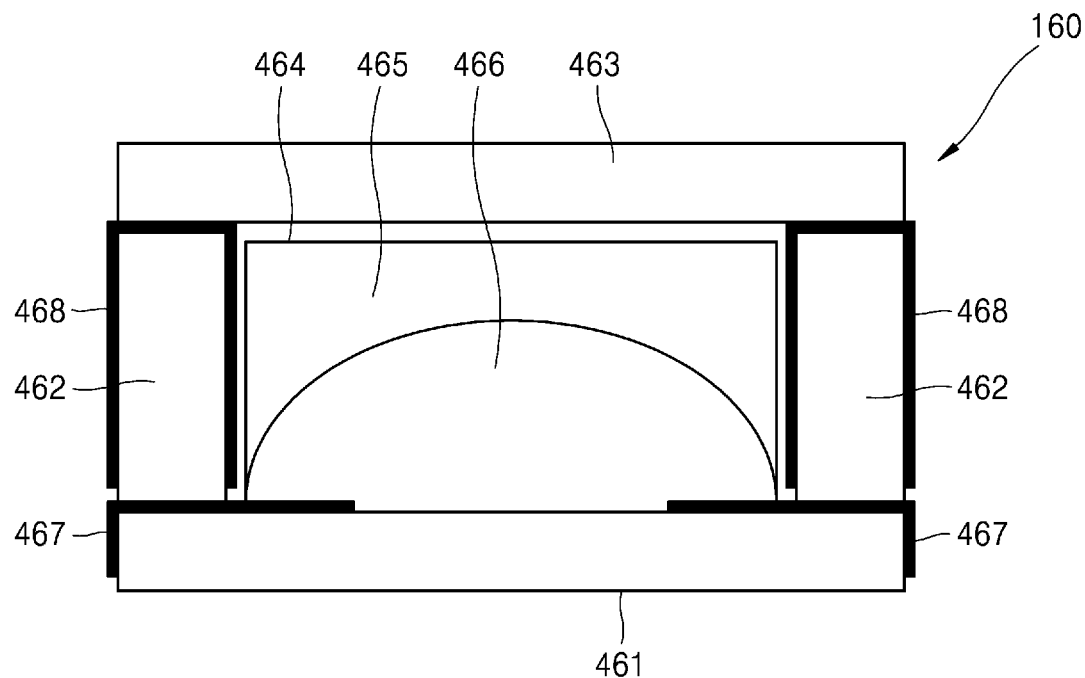
FIG. 25 is a view illustrating an operation of a focus tunable lens according to an embodiment.
Figure 26:
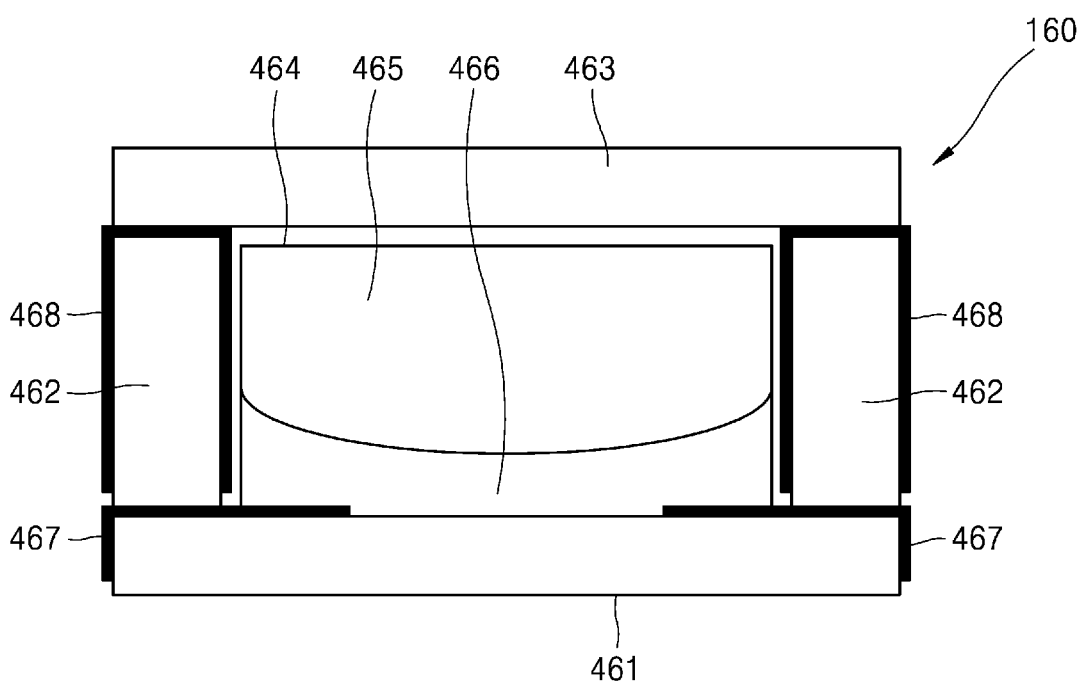
FIG. 26 is a view illustrating another operation of a focus tunable lens according to an embodiment.

FIGS. 25 and 26 are views illustrating an operation of a focus tunable lens 160 according to an embodiment.

Referring to FIGS. 25 and 26, the focus tunable lens 160 may be an electrowetting liquid lens including two transparent substrates 461 and 463, first and second media 465 and 466 that are positioned between the transparent substrates 461 and 463, and a sealing member 462 that seals the first and second media 465 and 466. The first and second media 465 and 466 are materials that are not mixed with each other and have different refractive indexes. For example, the first medium 465 may be a non-conductive fluid, and the second medium 466 may be a conductive fluid. Electrodes 467 and 468 are provided in a predetermined pattern in the inside sealed by the sealing member 462 and the transparent substrates 461 and 463, and an insulating layer 464 coats at least a part of the electrodes 467 and 468. As power is supplied to the electrodes 467 and 468, a wetting state of the insulating layer 464 may be changed, and as shown in FIGS. 25 and 26, an interface shape of the first and second media 465 and 466 may be changed. Accordingly, a curvature of the interface of the first and second media 465 and 466 may be changed by electrical control to control a vergence of the focus tunable lens 160. Because the focus tunable lens 160 that is a liquid lens is independent of polarization, the focus tunable lens 160 may reduce loss of light of a virtual image or light of a real scene compared to a method using polarization.

Figure 27:
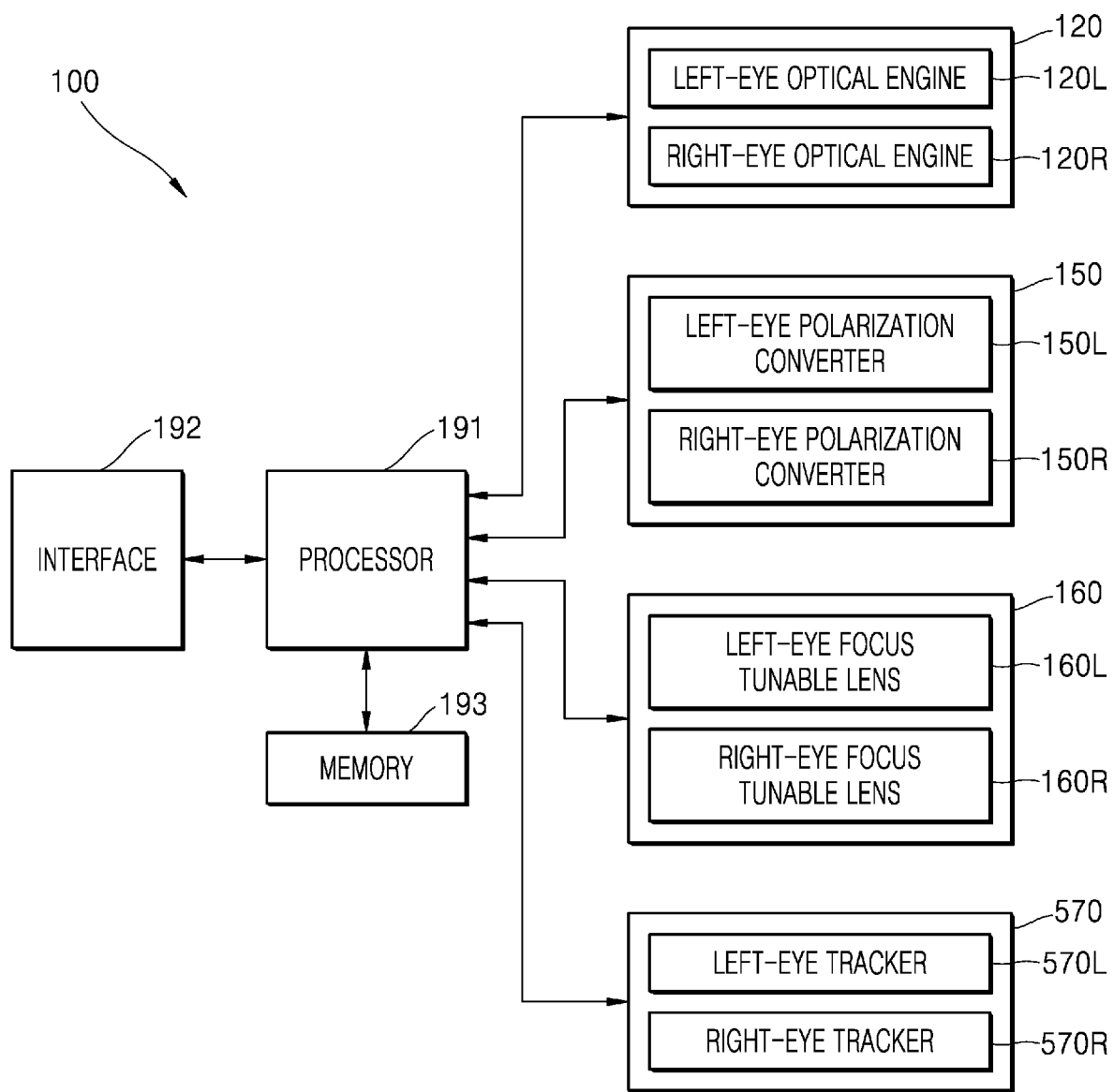
FIG. 27 is a block diagram of an AR device according to an embodiment.

FIG. 27 is a block diagram of an AR device 100 according to an embodiment. Referring to FIG. 27, the AR device 100 of the present embodiment includes the optical engine 120, the polarization converter 150, the focus tunable lens 160, the processor 191, the interface 192, the memory 193, and an eye tracker 570. The AR device 100 of the present embodiment is substantially the same as the AR device 100 of FIG. 3 and the described-above is equally applicable here.

The eye tracker 570 that is a device for tracking a gaze direction of a user's eye may obtain information about the gaze direction indicating the gaze direction of the user. The eye tracker 570 may include a left-eye tracker 570L and a right-eye tracker 570R. The processor 191 may obtain the user's gaze point by using information about a gaze direction of the left eye and information about a gaze direction of the right eye respectively obtained by the left-eye tracker 570L and the right-eye tracker 570R.

Figure 28:
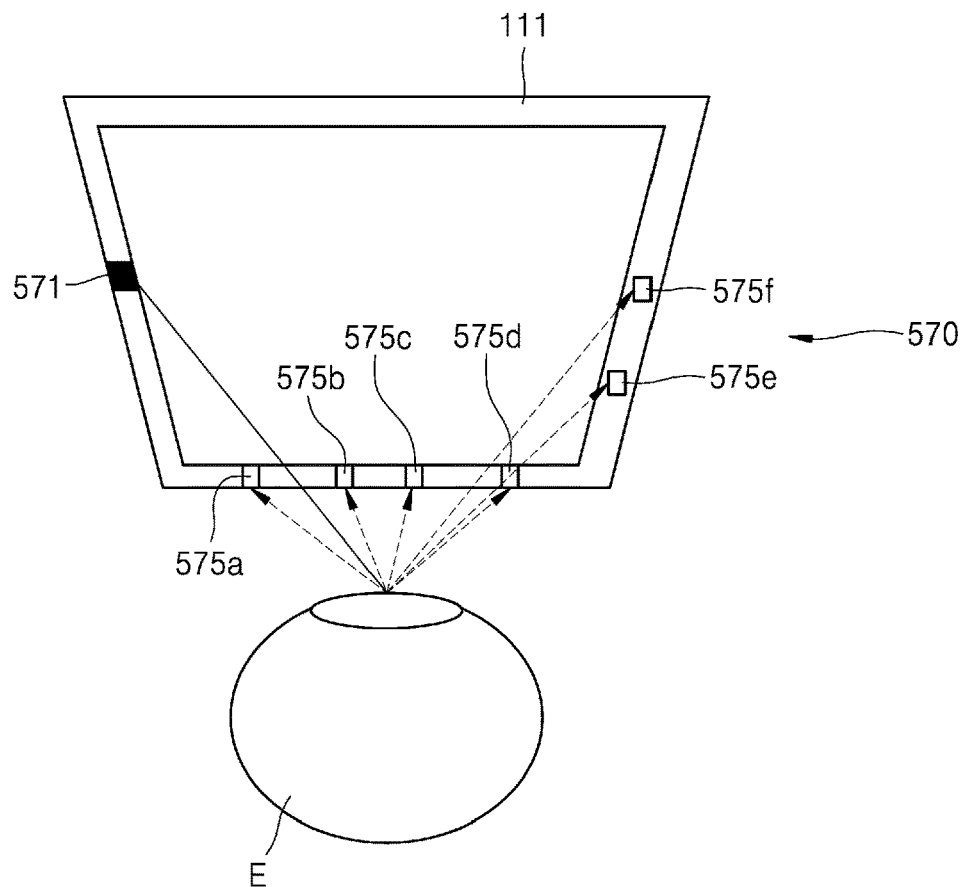
FIG. 28 is a view illustrating an eye tracker according to an embodiment.

FIG. 28 is a view illustrating an eye tracker 570 in an AR device according to an embodiment. Referring to FIG. 28, the eye tracker 570 may include an infrared emitter 571 and a plurality of infrared detectors 575a, 575b, 575b, 575d, 575e, and 575f. Although in FIG. 28 the eye tracker 570 includes the infrared emitter 571 and six infrared detectors (i.e., the infrared detectors 575a through 575f), embodiments are not limited thereto.

The infrared emitter 571 may emit infrared light to a corneal portion where a lens of an eyeball E of a user is located, and the plurality of infrared detectors 575a through 575f may detect infrared light reflected by a cornea. In an embodiment, the eye tracker 570 may obtain information about the amount of infrared light detected by each of the plurality of infrared detectors 575a through 575f, and may obtain information about a gaze direction of the user's eyeball E based on the obtained amount of infrared light. The eye tracker 570 may provide the obtained information about the gaze direction to the processor 191. For example, the information about the gaze direction obtained by the eye tracker 570 may be gaze angle information in horizontal and vertical directions of the user's left eye, and gaze angle information in horizontal and vertical directions of the user's right eye.

A method of tracking a gaze from information about a gaze direction measured by the eye tracker 570 will be described with reference to FIGS. 29 through 31.

Figure 29:
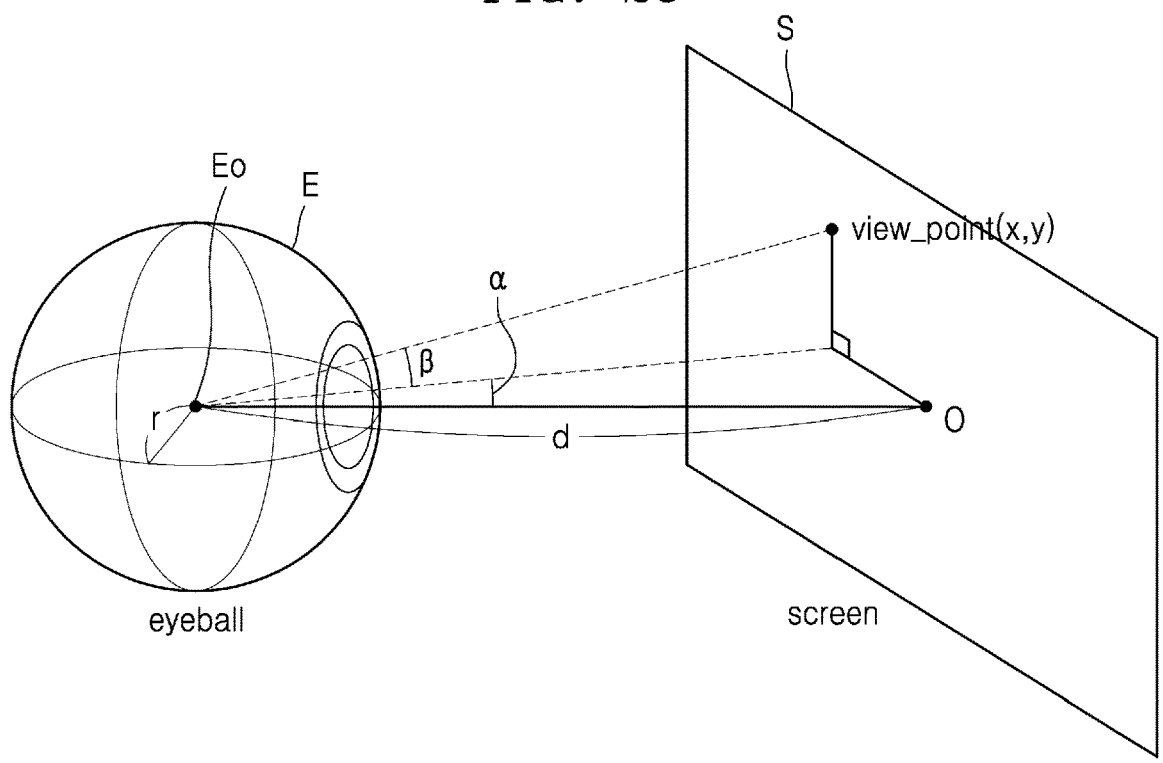
FIG. 29 is a view illustrating a 3D eyeball model for a gaze direction of a user.

FIG. 29 is a view illustrating a 3D eyeball model for a gaze direction of a user. Referring to FIG. 29, according to an embodiment, a gaze direction may be performed based on a 3D eyeball model for a gaze. According to the 3D eyeball model, when it is assumed that an eyeball has a perfect spherical shape and ideally rotates in a space according to a gaze, the gaze may be mathematically modeled by using Equations 1 and 2.

$$x = d \cdot \tan\alpha \quad \text{[Equation 1]}$$
$$y = d \cdot \sec\alpha \cdot \tan\beta$$

$$\beta = \sin^{-1}\frac{\Delta y}{r} \quad \text{[Equation 2]}$$
$$\alpha = \sin^{-1}\frac{\Delta x}{r\cos\beta}$$

In Equation 1, d denotes a distance between a center Eo of the user's eyeball and a virtual screen S, a denotes an angle of rotation of the user's eyeball in an x-axis (e.g., a horizontal axis) when the user's eye gazes at the front of the virtual screen S, and β denotes an angle of rotation of the user's eyeball in a y-axis (e.g., a vertical axis) when the user's eye gazes at the front of the virtual screen S. In Equation 2, r denotes a radius of a sphere on the assumption that the user's eyeball is the sphere.

The eye tracker 570 according to an embodiment may measure degrees of rotation a and β of the user's eyeball E, and the AR device 100 may calculate a two-dimensional (2D) coordinate value (x, y) of a gaze direction of the user's eyeball E on the virtual screen S by using the degrees of rotation α and β. The degrees of rotation a and β of the user's eyeball E may be gaze angle information in horizontal and vertical directions of the eyeball E.

An actual movement of the eyeball is not a desired 3D rotation, and in particular, in a leftward/rightward gaze, relaxation or contraction of eyeball muscles may be great and thus an error may occur during vertical gaze estimation for the leftward/rightward gaze based on a desired 3D rotating eyeball model. Due to the error, the AR device 100 may cause the user to see a random point, and may compare a gaze direction value estimated by the eye tracker 570 with an actual gaze direction value of the random point and may statistically process a comparison result, thereby improving accuracy.

Figure 30:
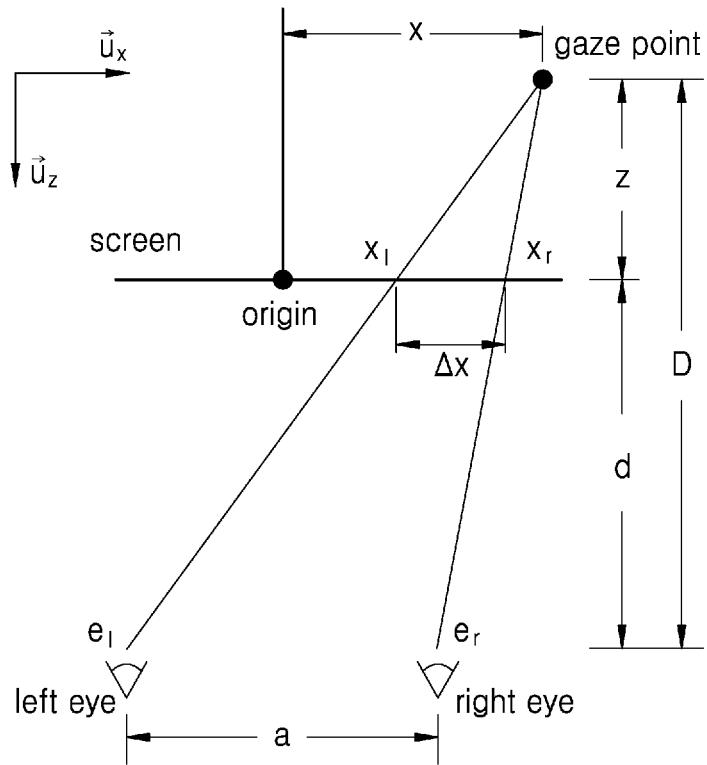
FIG. 30 is a view for describing a relationship between a gaze point and gaze angles of a user's left eye and right eye.

FIG. 30 is a view for describing a relationship between a gaze point and gaze angles of a user's left eye and right eye. FIG. 31 is a view for describing a relationship between a gaze point and a gaze angle in an upward gaze direction.

Figure 31:
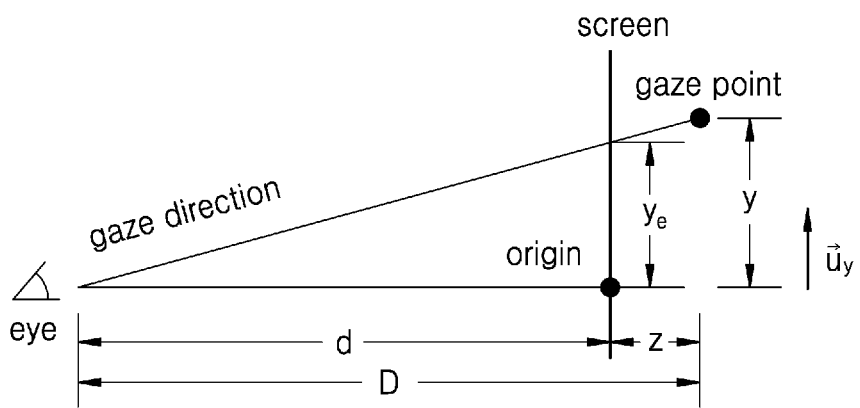
FIG. 31 is a view for describing a relationship between a gaze point and a gaze angle in an upward gaze direction.

Referring to FIGS. 30 and 31, a focal length may be estimated by using a difference between gaze directions (or gaze coordinates) of the left eye El and the right eye Er obtained by the eye tracker 570. When the focal length to a gaze point is to be obtained, gaze axes of the eyes might not meet each other, and in this case, it may be assumed that both eyes are at the same height and a coordinate of a vertical axis (e.g., y-axis) may be calculated as an average of coordinates of vertical axes (e.g., y-axes) of both eyes. It may be assumed that a distance 'a' between both eyes is, for example, 7 cm. The following equation may be obtained by using a proportional expression through the above geometric assumption.

$$\frac{-z}{\Delta x} = \frac{d-z}{a} \quad \text{[Equation 3]}$$

A distance to a virtual screen and the distance 'a' between eyes are required in Equation 3, and the distance may be obtained by measuring an angle of rotation of an eyeball by using a gaze image when the user gazes upfront. As a result, a distance 'D' to the gaze point is defined by Equation 4.

$$D = d + z = d + \frac{\Delta x d}{\Delta x - a} = \left(1 + \frac{\Delta x}{\Delta x - a}\right) \cdot d \quad \text{[Equation 4]}$$

Δx denotes a horizontal distance between gaze coordinates xl and xr of the left eye and the right eye on the virtual screen S, and may be obtained by using gaze angles of the user's left eye and right eye as shown in Equations 1 and 2.

An operation of the AR device 100 will be described with reference to FIG. 32.

Figure 32:
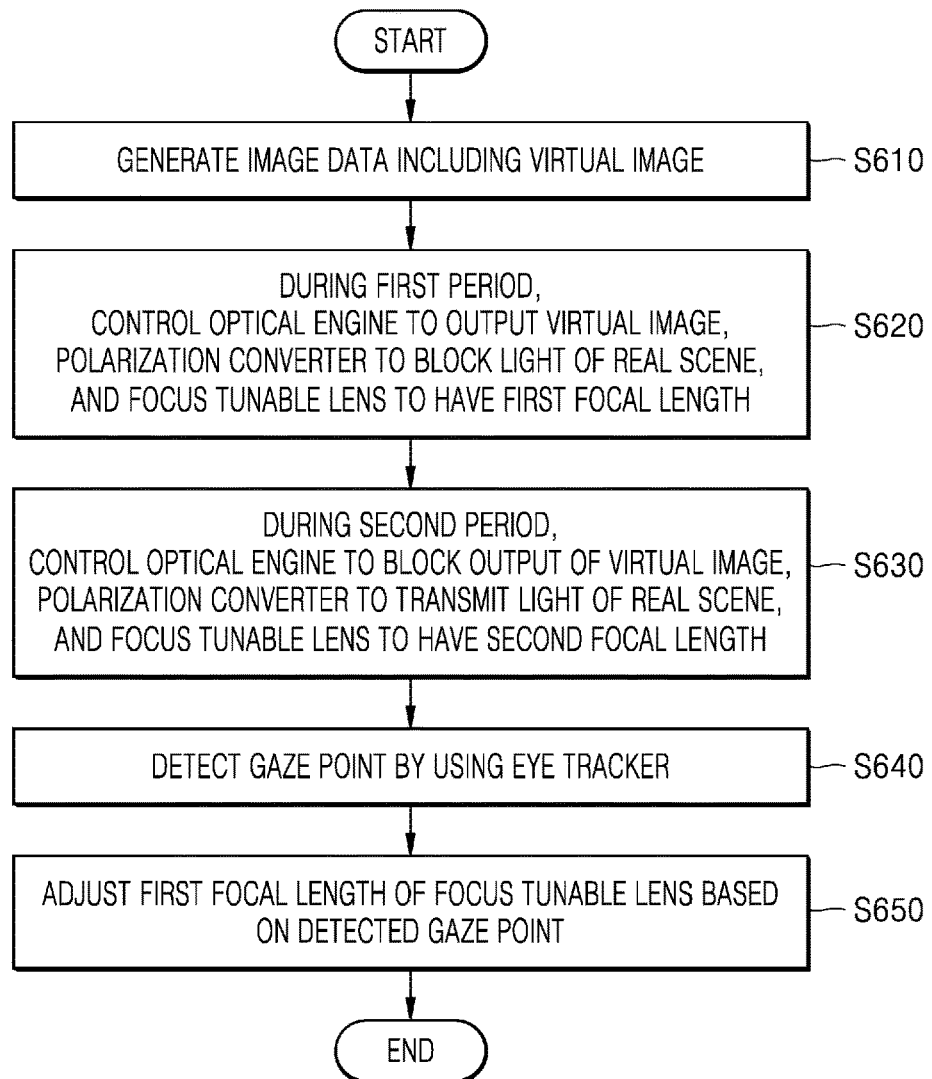
FIG. 32 is a flowchart for describing an operation of the AR device according to an embodiment.

FIG. 32 is a flowchart for describing an operation of the AR device 100 according to an embodiment. Referring to FIGS. 27 and 32, in operation S610, the processor 191 according to an embodiment generates image data including a virtual image based on data received through the interface 192 or data stored in the memory 193. When the image data including the virtual image may be image data that is time divided by temporally alternating a first period for outputting the virtual image and a second period for not outputting the virtual image.

In operation S620, during the first period, the processor 191 controls the optical engine 120 to output light Lv of the virtual image, controls the polarization converter 150 to be turned on so that light Lo of a real scene does not reach the focus tunable lens 160, and controls the focus tunable lens 160 to be turned on to have a first focal length. The processor 191 may control the focus tunable lens 160 to have the first focal length according to a depth of the virtual image.

The second period is subsequent to the first period. In operation S630, during the second period, the processor 191 controls the optical engine 120 not to output the light Lv of the virtual image, controls the polarization converter 150 to be turned off so that the light Lo of the real scene reaches the focus tunable lens 160, and controls the focus tunable lens 160 to be turned off to have a second focal length. The second focal length may be, for example, an infinite focal length (i.e., when there is no refractive power of the focus tunable lens 160), but the disclosure is not limited thereto.

Next, in operation S640, the processor 191 detects a user's gaze point by controlling the eye tracker 570. As described with reference to FIGS. 29 through 31, the left-eye tracker 570L may detect information about horizontal and vertical rotation angles (i.e., horizontal and vertical gaze angles) of the user's left eye and the right-eye tracker 570R may detect information about horizontal and vertical rotation angles (i.e., horizontal and vertical gaze angles) of the user's right eye, and the processor 191 may calculate the user's gaze point based on the detected information.

In an embodiment, gaze tracking may be performed while operation S620 of displaying the virtual image is performed (i.e., the first period).

In an embodiment, gaze tracking may be performed while operation 620 and operation 630 are alternately repeatedly performed. That is, gaze tracking may be performed while the first period and the second period are alternately repeatedly performed.

Next, in operation S650, the processor 191 may adjust the first focal length of the focus tunable lens 160 during the first period, based on the detected gaze point.

In an embodiment, the user may gaze at another point even when the AR device 100 displays the virtual image. In this case, the processor 191 may induce the user to be interested in the virtual image by readjusting the depth of the virtual image according to the calculated gaze point and readjusting the first focal length of the focus tunable lens 160.

In an embodiment, the processor 191 may control the first focal length of the focus tunable lens 160 more accurately according to the user's personal characteristics, based on the detected gaze point. The first focal length of the focus tunable lens 160 calculated before the user's gaze point is detected may be based on a standard interocular distance or a standard size of an eyeball. However, the first focal length (in other words, a vergence) of the focus tunable lens 160 suitable for the depth of the virtual image may vary according to the user's personal characteristics. That is, because an interocular distance or a size of an eyeball may vary according to the user's personal characteristics, the first focal length of the focus tunable lens 160 may be more accurately controlled based on the detected gaze point.

Figure 33:
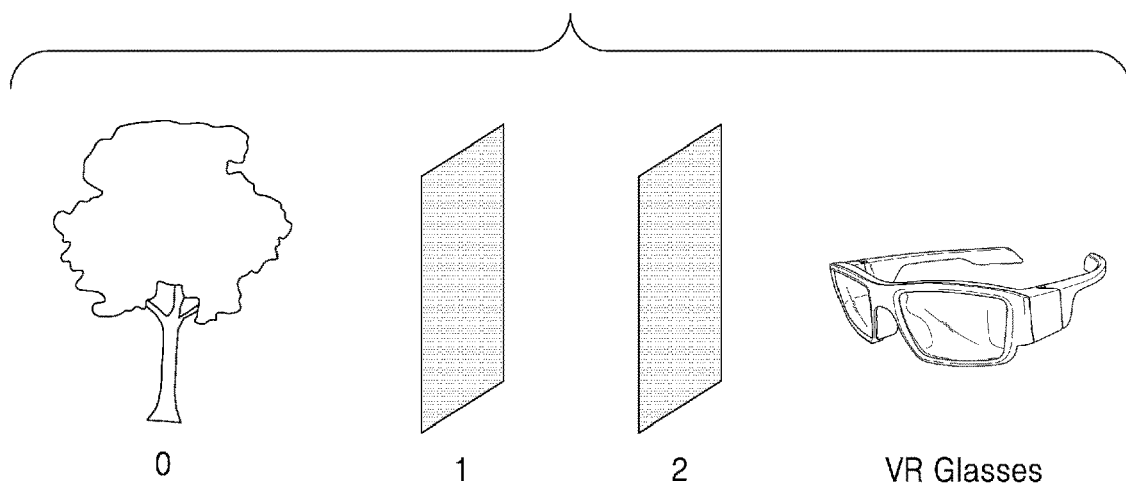
FIG. 33 is a view illustrating a case where there is a depth of interest in an AR image having three different depths.
Figure 34:
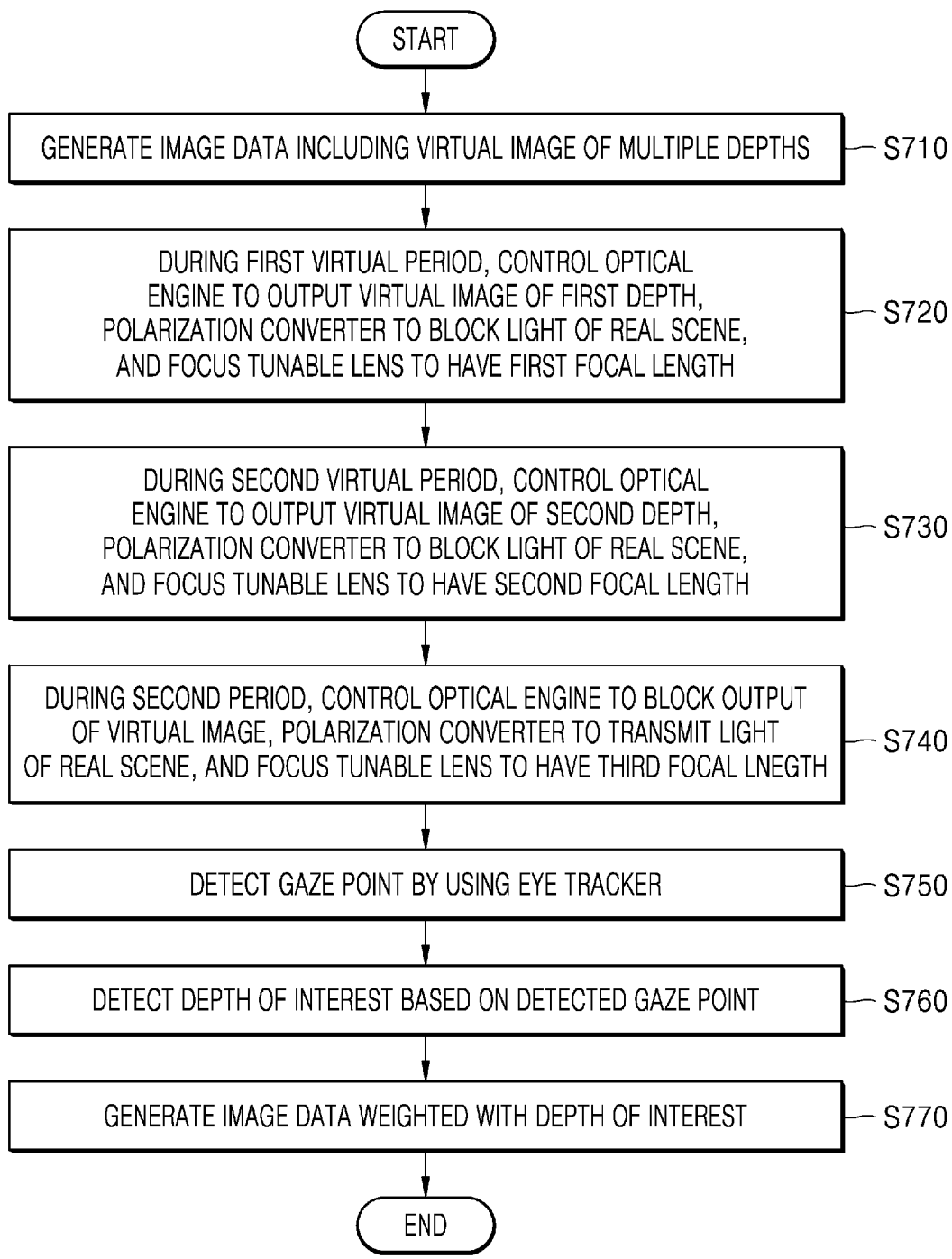
FIG. 34 is a flowchart for describing an operation of an AR device according to an embodiment.

FIG. 33 is a view illustrating a case where there is a depth of interest in an AR image having three different depths. FIG. 34 is a flowchart for describing an operation of an AR device according to an embodiment.

Referring to FIG. 33, a virtual image may include first and second virtual image layers 1 and 2 having different depths. When a depth of a real scene 0 is included, an AR image includes images having three depths in total. In this case, an operation of an AR device of the present embodiment will be described assuming that there is a user's depth of interest in the first virtual image layer 1.

Referring to FIGS. 27 and 34, in operation S710, the processor 191 according to an embodiment generates image data including a virtual image based on data received through the interface 192 or data stored in the memory 193. The image data including the virtual image may be image data that is time divided by temporally alternating a first period for outputting the first and second virtual image layers 1 and 2 and a second period for not outputting the virtual image. The first period includes a first virtual period and a second virtual period. During the first virtual period the first virtual image layer 1 is output. During the second virtual period the second virtual image layer 2 is output.

In operation S720, during the first virtual period, the processor 191 controls the optical engine 120 to output light Lv of the first virtual image layer 1, controls the polarization converter 150 to be turned on so that light Lo of a real scene does not reach the focus tunable lens 160, and controls the focus tunable lens 160 to be turned on to have a first focal length. The processor 191 may control the focus tunable lens 160 to have the first focal length according to a depth of the first virtual image layer.

In operation S730, during the second virtual period subsequent to the first virtual period, the processor 191 controls the optical engine 120 to output the light Lv of the second virtual image layer 2, controls the polarization converter 150 to be turned on so that the light Lo of the real scene does not reach the focus tunable lens 160, and controls the focus tunable lens 160 to be turned on to have a second focal length. The processor 191 may control the focus tunable lens 160 to have the second focal length according to a depth of the second virtual image layer.

The second period is subsequent to the second virtual period. In operation S740, during the second period, the processor 191 controls the optical engine 120 not to output the light Lv of the virtual image, controls the polarization converter 150 to be turned off so that the light Lo of the real scene reaches the focus tunable lens 160, and controls the focus tunable lens 160 to be turned off to have a third focal length. The third focal length may be, for example, an infinite focal length (i.e., when there is no refractive power of the focus tunable lens 160), but the disclosure is not limited thereto.

Next, in operation S750, the processor 191 detects a user's gaze point by controlling the eye tracker 570. As described with reference to FIGS. 29 through 31, the left-eye tracker 570L may detect information about horizontal and vertical rotation angles of the user's left eye and the right-eye tracker 570R may detect information about horizontal and vertical rotation angles of the user's right eye, and the processor 191 may calculate the user's gaze point based on the detected information.

In an embodiment, gaze tracking may be performed while operations S720 and S730 of displaying first and second virtual image layers are performed (i.e., the first and second virtual periods)

In an embodiment, gaze tracking may be performed while operations S720 through S740 are alternately repeatedly performed. That is, gaze tracking may be performed while the first and second virtual periods and the second period are alternately repeatedly performed.

In operation S760, the processor 191 detects or determines a depth of interest based on the detected gaze point. For example, the virtual image of the depth of interest may be the first virtual image layer 1. As such, when the virtual image of the depth of interest is determined, image data weighted with the depth of interest is generated.

Figure 35:
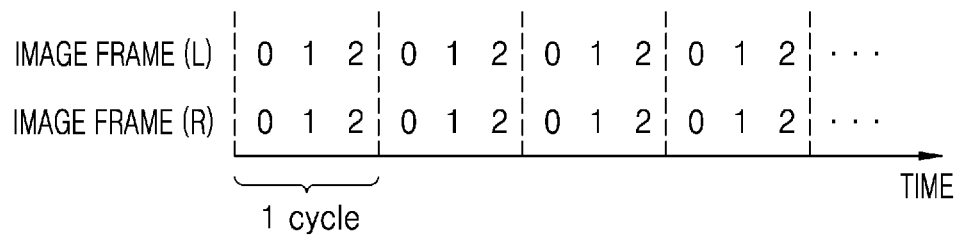
FIG. 35 is a diagram for describing a case where an AR image having three different depths is displayed without reflecting a depth of interest according to an embodiment.

FIG. 35 is a diagram for describing a case where an AR image having three different depths is displayed without reflecting a depth of interest according to an embodiment. In FIG. 35, 0 denotes a second period for showing a real scene, 1 denotes a first virtual period for showing a first virtual image layer, and 2 denotes a second virtual period for showing a second virtual image layer. The AR image illustrated in FIG. 35 has the same frequency number for each depth during one cycle.

Figure 36:
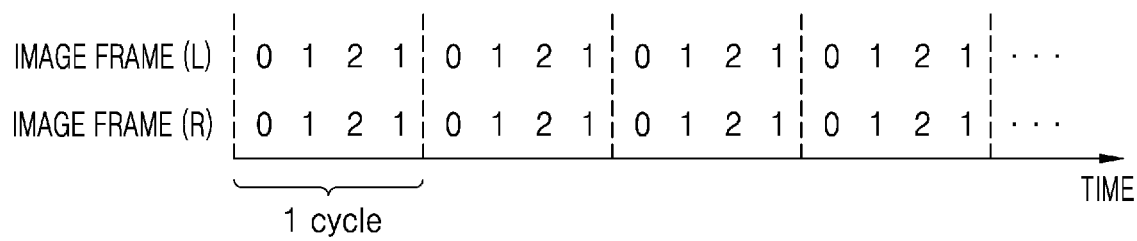
FIG. 36 is a diagram for describing a case where an AR image reflecting a depth of interest among three different depths is displayed according to an embodiment.

FIG. 36 is a diagram for describing a case where an AR image reflecting a depth of interest among three different depths is displayed according to an embodiment. Referring to FIG. 36, a frequency number of a first virtual period 1 for showing a first virtual image layer may be weighted during one cycle. For example, during the one cycle, the first virtual period 1 for showing an image of a depth of interest (i.e., the first virtual image layer) has a frequency number of 2, and each of a second virtual period 2 for showing a second virtual image layer and a second period 0 has a frequency number of 1. Accordingly, the AR device 100 may enable a user to more clearly see a virtual image of the depth of interest, e.g., a first virtual layer 1.

Figure 37:
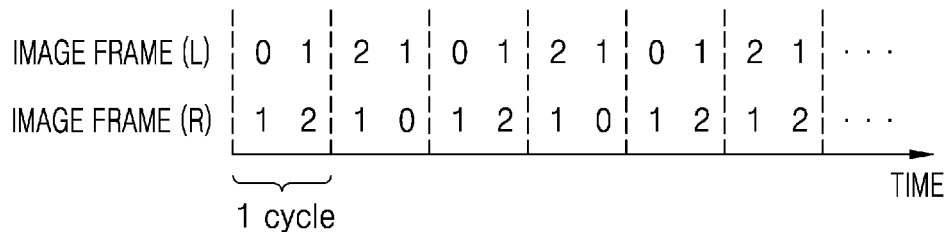
FIG. 37 is a diagram for describing a case where an AR image reflecting a depth of interest among three different depths is displayed according to an embodiment.

FIG. 37 is a diagram for describing a case where an AR image reflecting a depth of interest among three different depths is displayed according to an embodiment. Referring to FIG. 37, for example, when a left eye and a right eye are combined during one cycle, the second period 0 has a frequency number of 1, a first virtual period 1 has a frequency number of 2, and a second virtual period 2 has a frequency number of 1. A depth of a left-eye image and a depth of a right-eye image may be different from each other, and an image order in the one cycle may be different from an image order in a next cycle.

Figure 38:
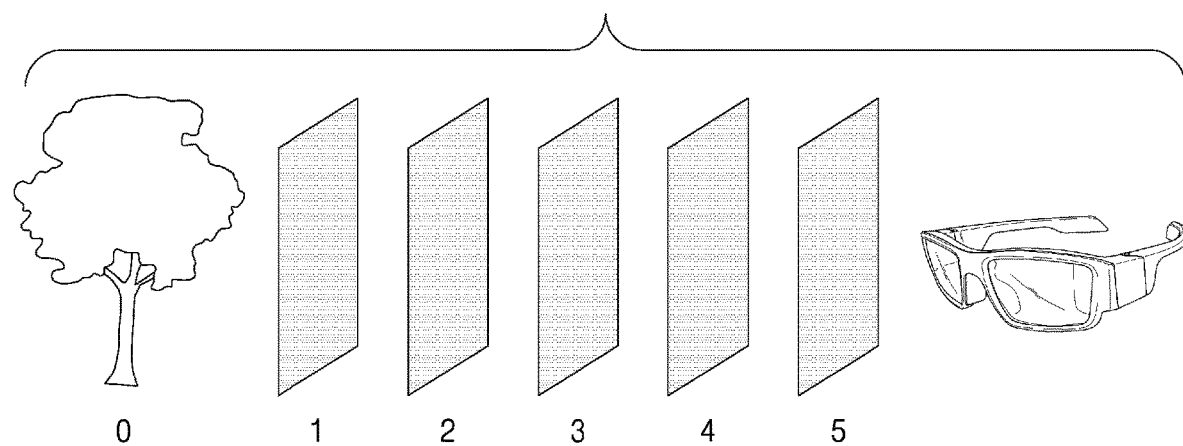
FIG. 38 is a view illustrating a case where there is a depth of interest in an AR image having six different depths.
Figure 39:
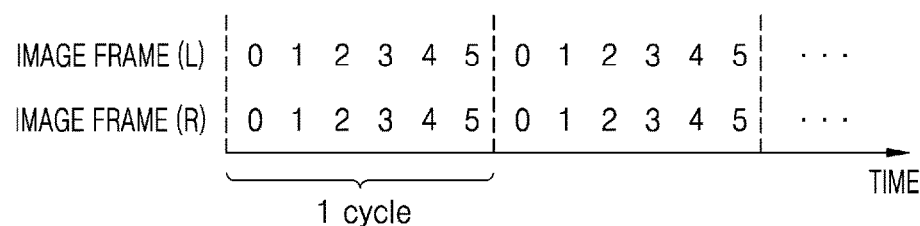
FIG. 39 is a diagram for describing a case where an AR image having six different depths is displayed without reflecting a depth of interest according to an embodiment.
Figure 40:
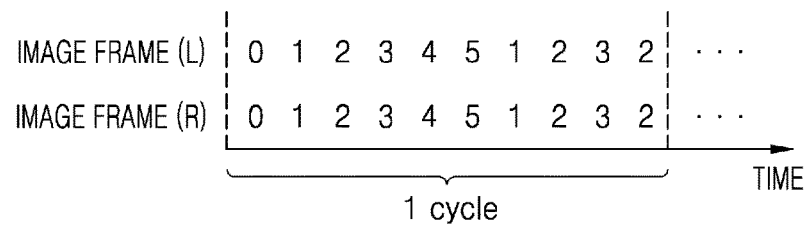
FIG. 40 is a diagram for describing a case where an AR image reflecting a depth of interest among six different depths is displayed according to an embodiment.

FIG. 38 is a view illustrating a case where there is a depth of interest in an AR image having six different depths. FIG. 39 is a diagram for describing a case where an AR image having six different depths is displayed without reflecting a depth of interest according to an embodiment. FIG. 40 is a diagram for describing a case where an AR image reflecting a depth of interest among six different depths is displayed according to an embodiment.

Referring to FIG. 38, a virtual image may have first through fifth virtual image layers 1, 2, 3, 4, and 5 having different depths. When a depth of a real scene 0 is included, an AR image includes images having six depths in total. In this case, an operation of an AR device of the present embodiment will be described assuming that there is a user's depth of interest in the second virtual image layer 2.

Referring to FIGS. 27 and 39, the processor 191 according to an embodiment generates image data in which the first through fifth virtual image layers 1, 2, 3, 4, and 5 and the real scene 0 (i.e., a period where the optical engine 120 does not output the virtual image) are sequentially repeated based on data received through the interface 192 or data stored in the memory 193. Also, the processor 191 may control the optical engine 120 and the optical components 130, and thus the user may sequentially see the first through fifth virtual image layers 1, 2, 3, 4, and 5 and the real scene 0. During one cycle, the first through fifth virtual image layers 1, 2, 3, 4, and 5 and the real scene 0 have the same frequency number.

The processor 191 detects the user's gaze point by controlling the eye tracker 570, and then generates image data reflecting a depth of interest based on the detected gaze point.

Referring to FIG. 40, for example, a frequency number of a second virtual period 2 for showing a second virtual image layer may be weighted to be the highest. Furthermore, a frequency number of each of first and third virtual periods 1 and 3 For showing first and third virtual image layers near to the second virtual image layer may be weighted. For example, during one cycle, the second virtual period 2 for showing an image of a depth of interest (i.e., the second virtual image layer) has a frequency number of 3, the first and third virtual periods 1 and 3 for showing first and third virtual image layers near to the second virtual image layer have a frequency number of 2, and fourth and fifth virtual periods 4 and 5 for showing fourth and fifth virtual image layers and a second period 0 have a frequency number of 1. Accordingly, the AR device 100 may enable a user to more clearly see a virtual image near to the depth of interest.

Figure 41:
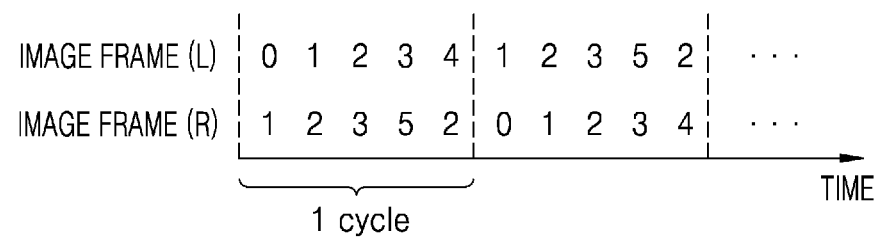
FIG. 41 is a diagram for describing a case where an AR image reflecting a depth of interest among six different depths is displayed according to an embodiment.

FIG. 41 is a diagram for describing a case where an AR image reflecting a depth of interest among six different depths is displayed according to an embodiment. Referring to FIG. 41, for example, when a left eye and a right eye are combined during one cycle, a second period 0 has a frequency number of 1, first and third virtual periods 1 and 3 have a frequency number of 2, a second virtual period 2 has a frequency number of 3, and fourth and fifth virtual periods 4 and 5 have a frequency number of 1. A depth of a left-eye image and a depth of a right-eye image may be different from each other. In this case, the processor 191 controls a focal length of the left-eye focus tunable lens 160L according to the depth of the left-eye image, and controls a focal length of the right-eye focus tunable lens 160R according to the depth of the right-eye image. An image order in the one cycle may be different from an image order in a next cycle. Although 10 image frames are included in one cycle in the embodiment of FIG. 40, 5 image frames may be included in one cycle in the embodiment of FIG. 41.

Figure 42:
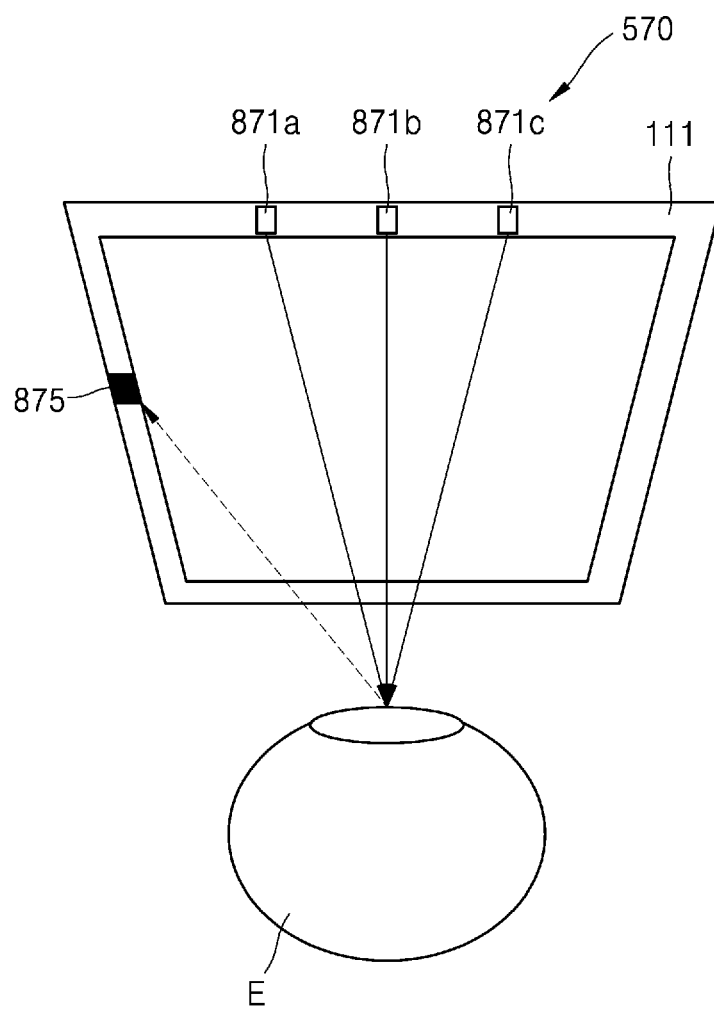
FIG. 42 is a view illustrating an eye tracker according to an embodiment.

FIG. 42 is a view illustrating an eye tracker 570 according to an embodiment. Referring to FIG. 42, the eye tracker 570 may include a plurality of light sources 871a, 871b, and 871c, and an image sensor or image sensors 875. The light sources 871a, 871b, and 871c may be infrared LEDs (IR LEDs), and may be positioned at different positions. For example, the light sources 871a, 871b, and 871c may be positioned on the frame 111. When a user's eye is photographed, the light sources 871a, 871b, and 871c may time-sequentially provide light (e.g., infrared light) to the user's eyeball E. As light is provided to the user's eyeball E, light reflected from the user's eyeball E may be generated.

The image sensor 875 may be an IR image sensor. Because positions of the light sources 871a, 871b, and 871c are different from one another, positions of reflected light in images of the user's eye captured by the image sensor 875 may be different from one another, and thus an AR device may track a gaze of the user's eye by using position information of the reflected light. For example, the eye tracker 570 may obtain rotation direction information (i.e., gaze angle information) of the user's eyeball E in horizontal and vertical directions by detecting a spot of the reflected light formed on the pupil in the image of the user's eyeball E, and may obtain gaze direction information based on the rotation direction information.

The eye tracker of FIG. 27 used in the AR device 100 is not limited to that of FIG. 28 or 42, and appropriate eye trackers may be used.

Figure 43:
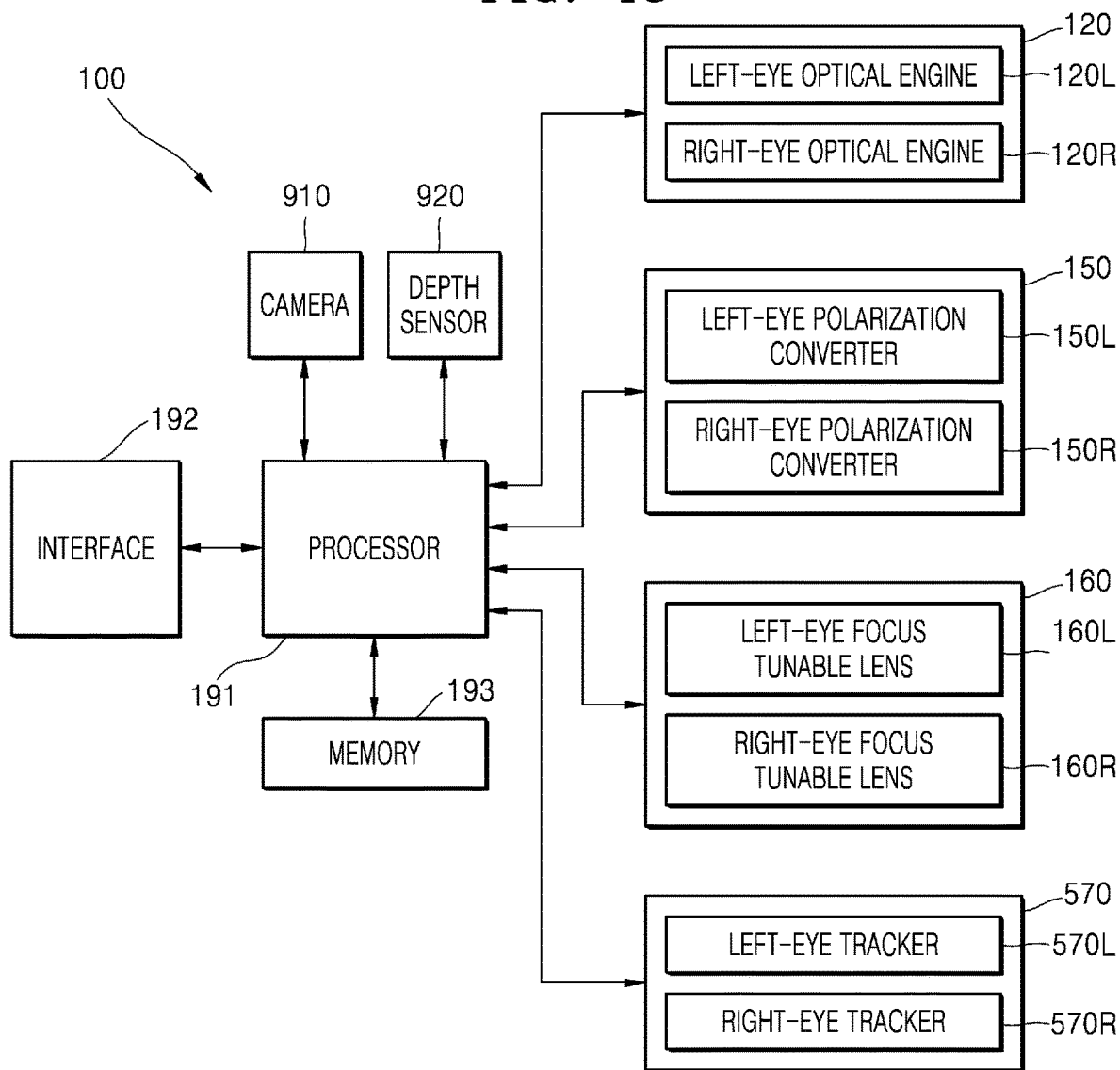
FIG. 43 is a block diagram of an AR device according to an embodiment.

FIG. 43 is a block diagram of an AR device 100 according to an embodiment. Referring to FIG. 43, the AR device 100 of the present embodiment includes the optical engine 120, the polarization converter 150, the focus tunable lens 160, the processor 191, the interface 192, the memory 193, the eye tracker 570, a camera 910, and a depth sensor 920. A 3D camera may be used, instead of the camera 910 and the depth sensor 920.

The AR device of the present embodiment is substantially the same as the AR device described above and, thus, the above-described with respect to various embodiments is equally applicable here.

The camera 910 may obtain a video and/or a still image by photographing a physical environment or a space seen by a user. The camera 910 may transmit obtained video data and/or still image data to the processor 191. In an embodiment, the camera 910 may visually monitor a surrounding space of the user. In an embodiment, the camera 910 may perform one or more controls or operations in an application driven by the processor 191, or may capture a gesture or a movement performed by the user as well as a real world object in the surrounding space to operate a character in the application.

The depth sensor 920 may be a camera that measures a depth value of the real world object seen by the user. The depth sensor 920 may scan the physical space or environment, may measure the depth value of the real world object located in the physical space or environment according to a 3D position coordinate value of the real world object, and may generate a depth map by locating the measured depth value according to each 3D position coordinate value. The depth sensor 920 may store generated depth map information in the memory 193 or a separate storage.

In an embodiment, the depth sensor 920 may obtain a depth image including the depth value of the real world object. The depth image may include a 2D pixel region of a photographed scene, and each pixel in the 2D pixel region may indicate a depth value such as a distance of the real world object in the scene photographed by using the depth sensor 920 in centimeters (cm), millimeters (mm), or the like.

The depth sensor 920 may measure a 3D depth value by using one of, for example, a stereo-type method, a time-of-flight (ToF), and a structured pattern. In an embodiment, the depth sensor 920 may include an RGB camera, a stereo camera, an infrared light component, and a 3D camera that may be used to capture a depth image of the real world object.

Figure 44:
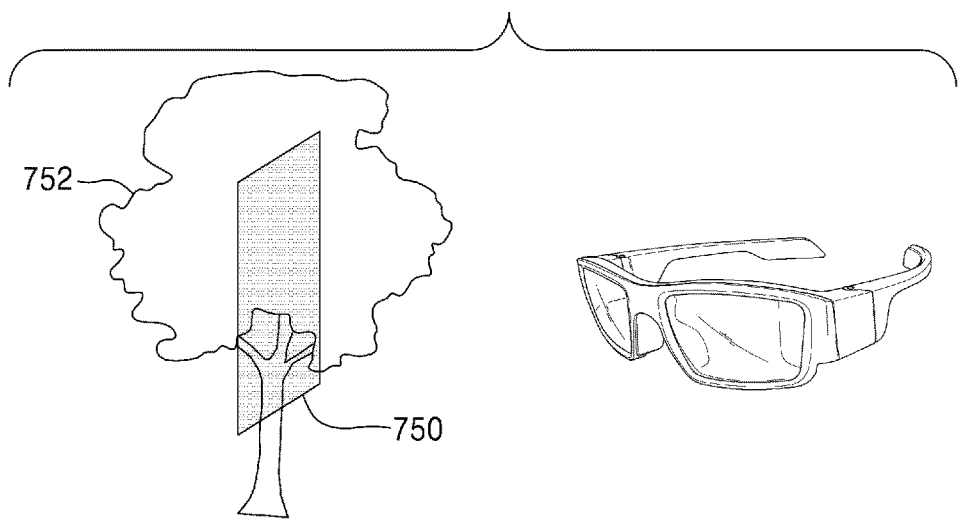
FIG. 44 is a view illustrating a case where a virtual image having a depth matched to a real world object is displayed.

FIG. 44 is a view illustrating a case where a virtual object 750 (e.g., a virtual image) having a depth matched to a real world object 752 is displayed. Referring to FIGS. 43 and 44, the depth sensor 920 may transmit a depth image including a depth value of a real world object to the processor 191 or may store the depth image in the memory 193 or a separate storage. In an embodiment, the processor 191 may obtain the depth image from the depth sensor 920 or may obtain the depth value of the real world object by loading a depth map that is previously stored in the memory 193 or a separate storage, and may change a depth of a virtual object (e.g., a virtual image) based on the obtained depth value. When the depth of the virtual object (e.g., the virtual image) is changed, a focal length of the focus tunable lens 160 may be re-adjusted according to the changed depth during a first period as in the above embodiments of the disclosure, thereby matching the depth of the virtual image including the virtual object to a position of the real world object.

Although the AR device 100 is glasses-type device, it will be understood by one of ordinary skill in the art that the AR device 100 may be embodied as or included in the head-mounted display apparatuses or AR helmets.

The AR device 100 according to the disclosure may be implemented as hardware elements, software elements, and/or a combination of hardware elements and software elements. For example, the AR device 100 according to the embodiments of the disclosure may be implemented by using a processor, an arithmetic logic unit (ALU), ASICs, DSPs, DSPDs, PLDs, microcomputers, microprocessors, or one or more general-purpose computers or special-purpose computers, such as a device capable of executing and responding to instructions.

The software may include a computer program, a code, an instruction, or a combination of one or more thereof, and may configure a processing device to operate as required or may separately or collectively command the processing device.

The software may be implemented in a computer program that includes instructions stored on a computer-readable storage medium. The computer-readable storage media may include magnetic storage media (e.g., read-only memories (ROMs), random-access memories (RAMs), floppy disks, hard disks, etc.) and optical reading media (e.g., compact disk read-only memories (CD-ROMs), digital versatile disks (DVDs), etc.). The computer-readable recording media may be distributed in computer systems connected via a network and may store and execute computer-readable codes in a distributed fashion. The media may be computer-readable, may be stored in a memory, and may be executed by a processor.

The computer may be a device configured to call instructions stored in the storage media, and in response to the called instructions, to perform an operation according to the embodiments of the disclosure, and may include the AR device 100 according to the embodiments of the disclosure.

The computer-readable storage medium may be provided as a non-transitory storage medium. Here, 'non-transitory' means that the storage medium does not include a signal and is tangible, but does not distinguish whether data is stored semi-permanently or temporarily on the storage medium.

Further, the AR device 100 or the method of operating the same according to the embodiments of the disclosure may be provided in a computer program product. The computer program product is a product that may be traded between a seller and a purchaser as a product.

The computer program product may include a software program and a computer-readable storage medium in which the software program is stored. For example, the computer program product may include a product (e.g., a downloadable application) that is electronically distributed as a software program through an electronic market (e.g., Google Play Store or AppStore) or a manufacturer of the AR device 100. For electronic distribution, at least a part of the software program may be stored in a storage medium or may be temporarily generated. In this case, the storage medium may be a server of the manufacturer, a server of the electronic market, or a storage medium of a relay server that temporarily stores the software program.

The computer program product may include a storage medium of a server or a storage medium of a terminal in a system including the server and the terminal (e.g., an AR device). Alternatively, when there is a third device (for example, a smartphone) communicating with the server or the terminal, the computer program product may include a storage medium of the third device. Alternatively, the computer program product may include a software program itself transmitted from the server to the terminal or the third device or from the third device to the terminal.

In this case, one of the server, the terminal, and the third device may execute the method according to the embodiments of the disclosure by executing the computer program product. Alternatively, at least two of the server, the terminal, and the third device may execute the method according to the embodiments of the disclosure in a distributed fashion by executing the computer program product.

For example, the server (e.g., a cloud server or an artificial intelligence (AI) server) may execute the computer program product stored in the server and control the terminal communicating with the server to perform the method according to the embodiments of the disclosure.

As another example, the third device may execute the computer program product and control the terminal communicating with the third device to perform the method according to the embodiments of the disclosure.

When the third device executes the computer program product, the third device may download the computer program product from the server and execute the downloaded computer program product. Alternatively, the third device may execute the computer program product that is freeloaded and perform the method according to the embodiments of the disclosure.

According to the disclosure, an electronic device and method of displaying AR may reduce eyestrain.

According to the disclosure, an electronic device and method of displaying AR may provide a virtual image responding to a region of interest of a user by tracking the user's gaze.

While embodiments of the disclosure have been particularly shown and described with reference to the drawings, the embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. An electronic device for displaying augmented reality, the electronic device comprising:
    an optical engine configured to output light of a virtual image;
    a waveguide from which the light of the virtual image is output and through which light of a real scene is transmitted;
    an optical shutter configured to transmit or block the light of the real scene;
    a focus tunable lens configured to adjust a focal length for the light of the virtual image output from the waveguide; and
    one or more processors configured to:
        during a first period, control the optical shutter to block at least part of a first light of the real scene, and control the focus tunable lens to have a first focal length, and
        during a second period, control the optical shutter to transmit a second light of the real scene, and control the focus tunable lens to have a second focal length different from the first focal length.

2. The electronic device of claim 1, wherein the optical shutter comprises a liquid crystal panel.

3. The electronic device of claim 1, wherein the one or more processors are further configured to, during the first period, control the optical engine to output the light of the virtual image, and during the second period, control the optical engine not to output the light of the virtual image.

4. The electronic device of claim 1, wherein the first focal length is for moving an image plane of the virtual image to a position of a depth of the virtual image.

5. The electronic device of claim 1, wherein the second focal length is infinite.

6. The electronic device of claim 1, wherein the second focal length is for correcting a user's vision.

7. The electronic device of claim 1, wherein the first period and the second period alternate.

8. The electronic device of claim 1, wherein the one or more processors are further configured to, during the first period, control the optical engine to output light of a plurality of virtual image layers having different depths, respectively, through time division, and control the focus tunable lens according to different first focal lengths corresponding to the different depths of the plurality of virtual image layers.

9. The electronic device of claim 1, further comprising an eye tracker configured to track a gaze of a user.

10. The electronic device of claim 9, wherein the one or more processors are further configured to, during the first period, control the optical engine to output light of the virtual image so that the virtual image has a depth of a gaze point of the user whose gaze is tracked by the eye tracker.

11. The electronic device of claim 9, wherein the one or more processors are further configured to, during the first period, control the optical engine to output light of a plurality of virtual image layers having different depths, respectively, and
    wherein a frequency of a first virtual image layer having a depth closer to a gaze point of the user whose gaze is tracked by the eye tracker is greater than a frequency of a second virtual image layer having a depth farther from the gaze point of the user, among the plurality of virtual image layers.

12. The electronic device of claim 1, wherein the focus tunable lens comprises one of a liquid crystal lens, a liquid lens, or a movable lens.

13. The electronic device of claim 1, wherein the electronic device comprises a glasses-type device.

14. The electronic device of claim 1, further comprising a depth sensor configured to measure a depth value of a real world object seen by a user,
    wherein the one or more processors are further configured to control the optical engine to output light of the virtual image so that the virtual image has the depth value of the real world object.

* * * * *